(12) United States Patent
Asveren et al.

(10) Patent No.: US 9,769,140 B1
(45) Date of Patent: Sep. 19, 2017

(54) AUTHENTICATION SUPPORT FOR AUTONOMOUS REQUESTS

(71) Applicant: Sonus Networks, Inc., Westford, MA (US)

(72) Inventors: Tolga Asveren, Bordentown, NJ (US); Shaun Jaikarran Bharrat, Manalapan, NJ (US); Subhransu S. Nayak, Nashua, NH (US)

(73) Assignee: SONUS NETWORKS, INC., Westford, MA (US)

( * ) Notice: Subject to any disclaimer, the term of this patent is extended or adjusted under 35 U.S.C. 154(b) by 125 days.

(21) Appl. No.: 14/850,333

(22) Filed: Sep. 10, 2015

(51) Int. Cl.
*H04L 29/06* (2006.01)
*H04L 29/08* (2006.01)

(52) U.S. Cl.
CPC .......... *H04L 63/08* (2013.01); *H04L 65/1006* (2013.01); *H04L 67/14* (2013.01)

(58) Field of Classification Search
CPC ..... H04L 63/08; H04L 67/14; H04L 65/1006; H04L 65/1016; H04L 65/1069; H04L 65/105; H04L 65/1033
USPC .......................................................... 726/7
See application file for complete search history.

(56) References Cited

U.S. PATENT DOCUMENTS

| | | | | |
|---|---|---|---|---|
| 9,137,028 | B1* | 9/2015 | McConkey | H04L 12/1813 |
| 2008/0123687 | A1* | 5/2008 | Bangalore | H04L 65/104 |
| | | | | 370/467 |
| 2008/0219241 | A1* | 9/2008 | Leinonen | H04L 29/12594 |
| | | | | 370/352 |
| 2013/0212646 | A1* | 8/2013 | McFarland | H04L 63/08 |
| | | | | 726/4 |

OTHER PUBLICATIONS

Cycon, Hans L., et al. "Connecting the worlds: multipoint videoconferencing integrating H. 323 and IPv4, SIP and IPv6 with autonomous sender authentication." Consumer Electronics, 2009. ISCE'09. IEEE 13th International Symposium on. IEEE, 2009.*
El-Mousa, A. and Al Saidat, S., Apr. 2015. The design of a secure SIP-based architecture for broadband service providers. In Information and Communication Systems (ICICS), 2015 6th International Conference on (pp. 89-94). IEEE.*

* cited by examiner

*Primary Examiner* — Syed Zaidi
(74) *Attorney, Agent, or Firm* — Stephen T. Straub; Ronald P. Straub; Michael P. Straub

(57) ABSTRACT

Methods and apparatus for supporting authentication for session border controller generated autonomous requests are described. In some embodiments, the session border controller stores a response to a challenge being communicated through the session border controller from an entity with authentication credentials, e.g., a user equipment device, to an authenticating entity. The stored response is available to be used by the SBC at a future time in generating an autonomous request that may be able to pass an authentication check by the authenticating entity. In some embodiments, a session border controller, which has received a challenge to a SBC generated autonomous request from an authenticating entity, generates and sends a request triggering signal to an entity with authentication credentials and subsequently uses the received challenge from the entity with authenticating entity to challenge and acquire a response, e.g., a authorization header, that can will satisfy the authenticating entity.

20 Claims, 18 Drawing Sheets

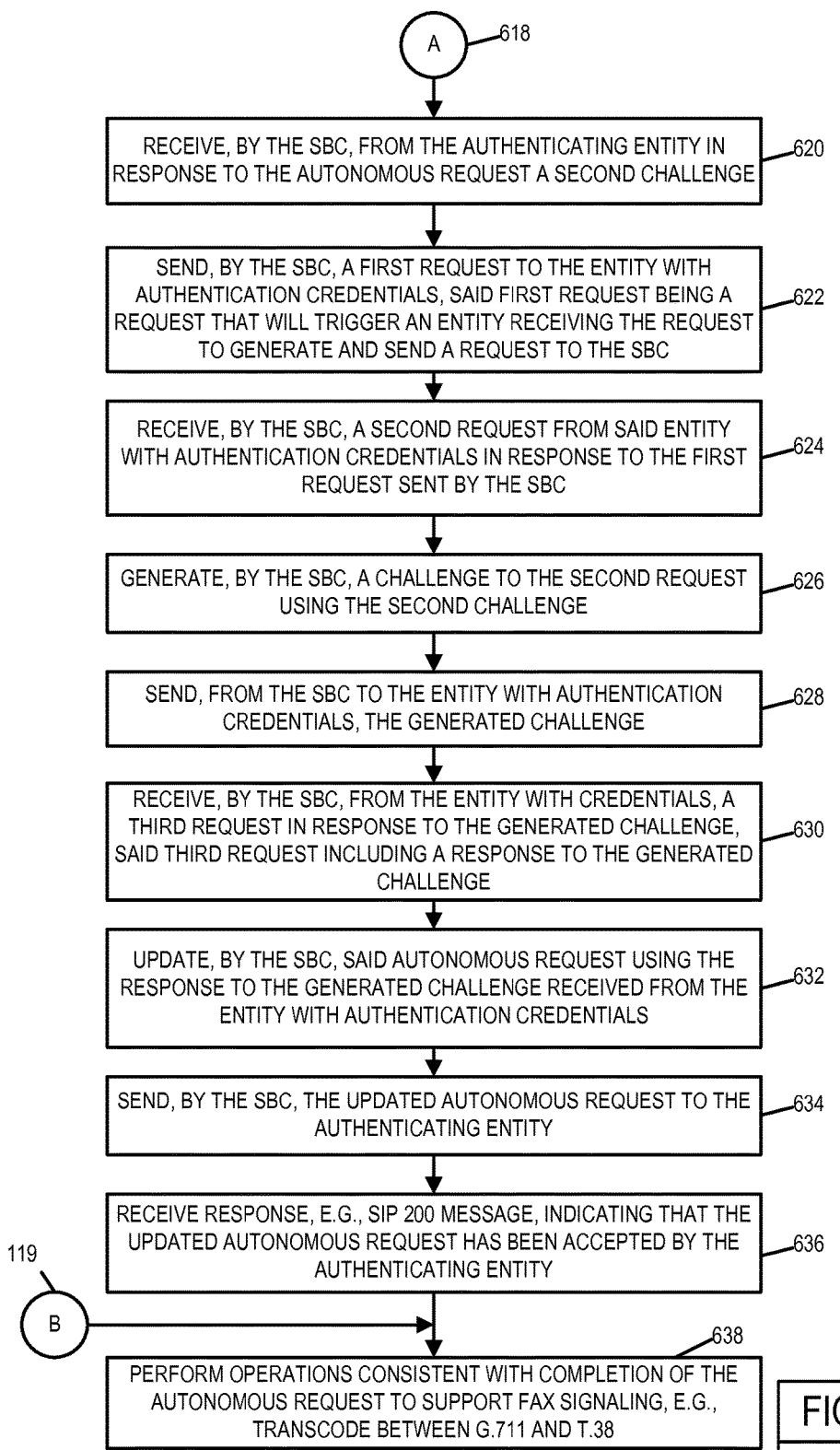

AUTHENTICATION SUPPORT FOR AUTONOMOUS REQUESTS

FIELD OF INVENTION

The present invention relates to methods and apparatus supporting authentication and, more particularly, to methods and apparatus for supporting authentication of autonomous requests from intermediary devices, e.g., session border controllers.

BACKGROUND

In SIP networks, sometimes intermediary network elements, e.g., a session border controller (SBC), need to generate an autonomous SIP request. An autonomous request is a request, which is not generated due to the receipt of a request from another network element but generated by the intermediary as part of some functionally and/or procedure.

FIG. 1 is a drawing 100 illustrating a secession border controller (SBC) 102, a first device 104, a second device 106 and exemplary signaling. FIG. 1 illustrates 2 types of requests that are generated by the SBC 102, a non-autonomous request and an autonomous request.

In step 108 the first device 104 generates and transmits request 1 110. In step 112 the session border controller receives request 1 110. In step 114, in response to received request 1 110, the SBC 102 generates and transmits request 1' 116, which is a non-autonomous request. Non-autonomous request 1' 116 was generated by SBC 102 because of the receipt of request 1 110. In step 118 non-autonomous request 1' 116 is received by the second device 106.

In step 120, the SBC generates and transmits request 2 122, which is an autonomous request. Autonomous request 2 122 was generated by SBC 102 to satisfy some functionality/procedure. In step 124 second device 106 receives autonomous request 2 122.

FIG. 2 is a drawing 200 illustrating an example in which an autonomous request is needed. Drawing 200 of Figured 2 illustrates a secession border controller (SBC) 202, a first device 204, a second device 206 and exemplary signaling. Consider that in steps (208, 210, 212) the devices (first device 208, SBC 202, second device 212) have been operated, respectively to establish a stable call including stable call leg A 214 and stable call leg A' 216. Further consider that leg A 214 supports G.711, while leg A' 216 supports G.711 and T.38.

Consider that in steps (218, 220) the devices (first device 204, SBC 202) are operated, respectively to send and received G.711 stream signals 224 over leg A. Further consider that in steps (221, 222) the devices (SBC 202, second device 206) are operated, respectively, to send and received G.711 stream signals 226 over leg A'.

In step 228, SBC 202 detects a fax tone. In step 230 the SBC 202 decides to invite leg-A' to T.38 and will transcode between G.711 and T.38 as leg-A does not support T38; the SBC 202 knows through configuration which legs support which protocols. Based on the detected fax tone, the SBC re-negotiates the session toward one leg to use T.38 for fax transmission or sends a re-INVITE to lock-down on a single codec if the session answer has more than one codec. In step 232 the SBC generate and transmits a re-Invite 234 including SDP: T.38 information 240, e.g., a parameter indicating the T.38 fax relay standard.

A general problem with autonomous requests off the intermediaries is authentication. Successful authentication of a request requires access to credentials, e.g., password corresponding to an identity, and is usually not available to intermediaries causing autonomous request to be unsuccessful if the autonomous requests are challenged. Drawing 300 of FIG. 3 illustrates an SBC 302, an authenticating entity 304, and exemplary signaling. Drawing 300 illustrates an example, in which an autonomous request is challenged and the SBC does not have credentials.

In step 306 SBC 302 generates and transmits an autonomous request 308 including no authorization header. The autonomous request 308 is received by the authenticating entity in step 310. The authenticating entity decides to challenge the received autonomous request 308. In step 312, the authenticating entity generates and transmits a SIP 401 (unauthorized message) 314 including a challenge that is the included WWW-Authenticate header 316. In step 318 the SBC 302 receives the SIP 401 message. In step 320 the SBC determines that it does not have access to the credentials and cannot send the autonomous request with credentials and the relevant procedure fails.

Based on the above discussion, there is a need for new methods and apparatus for supporting authentication of autonomous requests sent intermediate network devices, e.g., session border controllers.

SUMMARY

Methods and apparatus for supporting authentication for session border controller (SBC) generated autonomous requests are described. In some embodiments, the session border controller stores a response to a challenge being communicated through the session border controller from an entity with authentication credentials, e.g., a user equipment device, to an authenticating entity, e.g., a SIP Registrar/Application Server. The stored response is available to be used by the SBC at a future time in generating an autonomous request that may be, and in some embodiments is, able to pass an authentication check by the authenticating entity based on information in the stored response.

In some embodiments, a session border controller, which has received a challenge to a SBC generated autonomous request from an authenticating entity, generates a request toward an entity with authentication credentials, which in turn triggers another request off the entity with credentials, and the SBC challenges the another request. This SBC generated challenge uses the challenge that the SBC previously received from the authenticating entity in response to a previously sent SBC generated autonomous request. Once the SBC receives the response from the entity with credentials, the SBC generates an updated autonomous request including information from the response from the entity with credentials, e.g., an authorization header. The SBC sends the updated autonomous request to the authenticating entity, said updated autonomous request included a valid challenge response which is expected to satisfy the authenticating entity.

An exemplary method of operating a session border controller, in accordance with some embodiments, includes: storing, by the session border controller, a response from an entity with authentication credentials to a first challenge from an authenticating entity, said response being communicated through the session border controller; generating, by the session border controller, an autonomous request using the stored response; and sending the autonomous request to the authenticating entity.

An exemplary method of operating a session border controller (SBC), in accordance with some embodiments, includes: coupling an entity with authentication credentials to an authenticating entity through the SBC; sending an autonomous request, generated by the session border controller, to the authenticating entity; receiving a challenge from the authenticating entity in response to the autonomous request; sending, by the SBC, a request triggering signal to the entity with authentication credentials, said request triggering signal triggering an entity receiving the signal to generate and send a request to the SBC; receiving, by the SBC, a first request from said entity with authentication credentials in response to the request triggering signal sent by the SBC; generating, by the SBC, a challenge to the first request using the challenge received from the authenticating entity; sending, from the SBC to the entity with credentials, the generated challenge in response to the first request; receiving, by the SBC, from the entity with credentials, a second request in response to the generated challenge, said second request including a response to the generated challenge; updating, by the SBC, said autonomous request using the response to the generated challenge received from the entity with authentication credentials; and sending, by the SBC, the updated autonomous request to the authenticating entity.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description that follows.

BRIEF DESCRIPTION OF THE DRAWINGS

FIG. 6B illustrates a second part of a flowchart showing the steps of an exemplary method of operating a Session Border Controller (SBC) in accordance with various exemplary embodiments of the present invention.

FIG. 6 comprises the combination of FIG. 6A and FIG. 6B.

DETAILED DESCRIPTION

Figure 1:
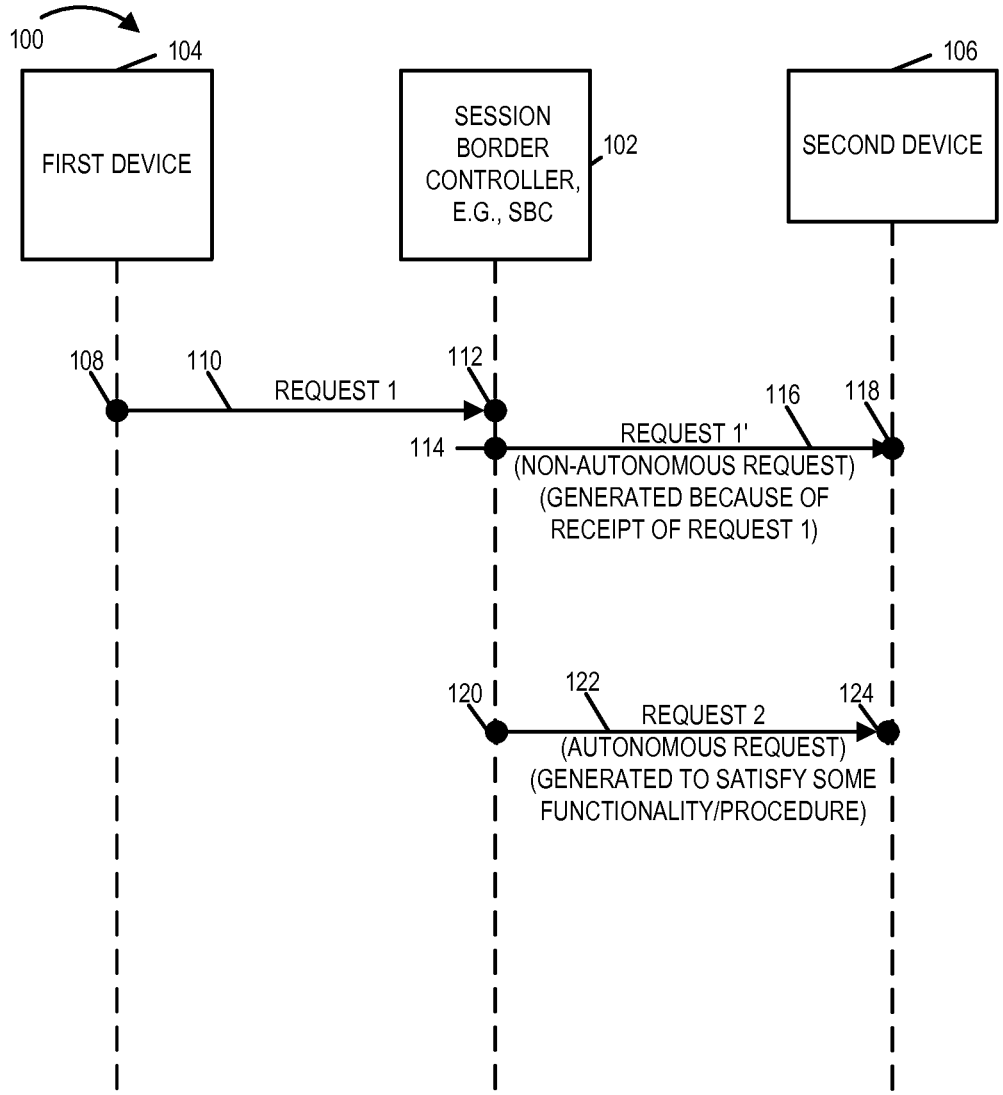
FIG. 1 illustrates an exemplary non-autonomous request from a session border controller and an exemplary autonomous request from a session border controller.
Figure 2:
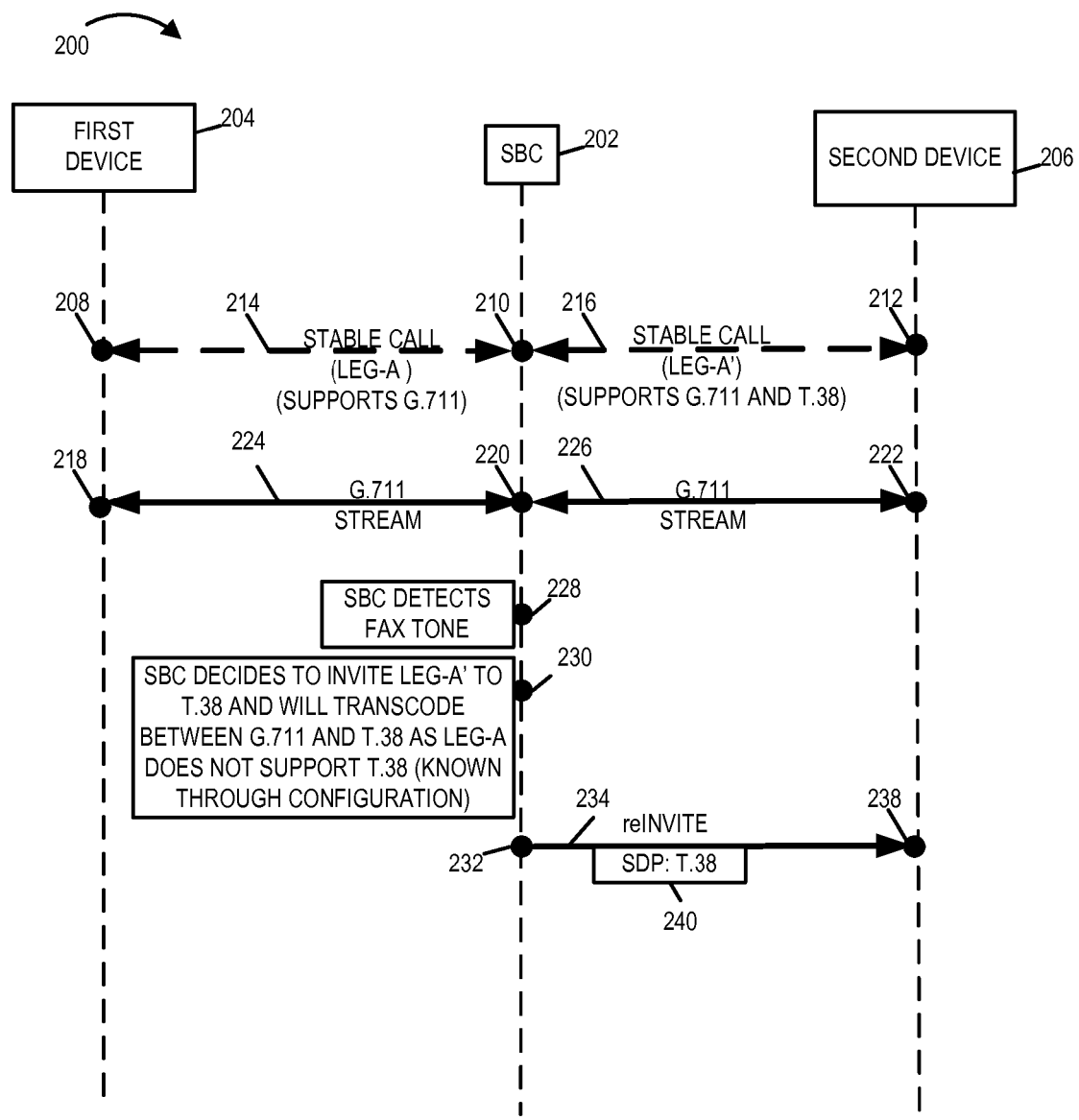
FIG. 2 illustrates an example in which a session border controller generates an autonomous request in response to a detected fax tone.
Figure 3:
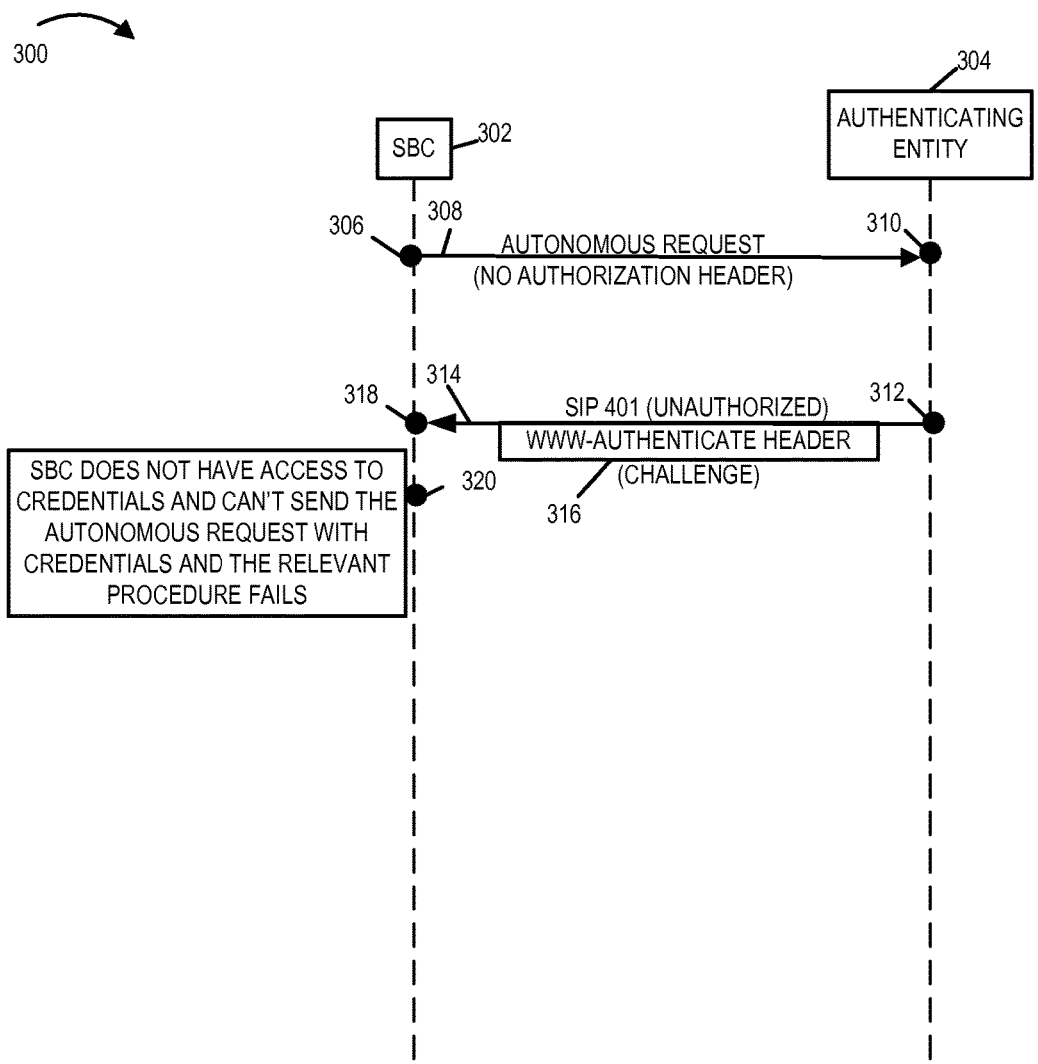
FIG. 3 illustrates an example in which an autonomous request sent from an authenticating entity by a session border controller is challenged and the SBC is unable to respond to the challenge because the SBC does not have access to authentication credentials.
Figure 4:
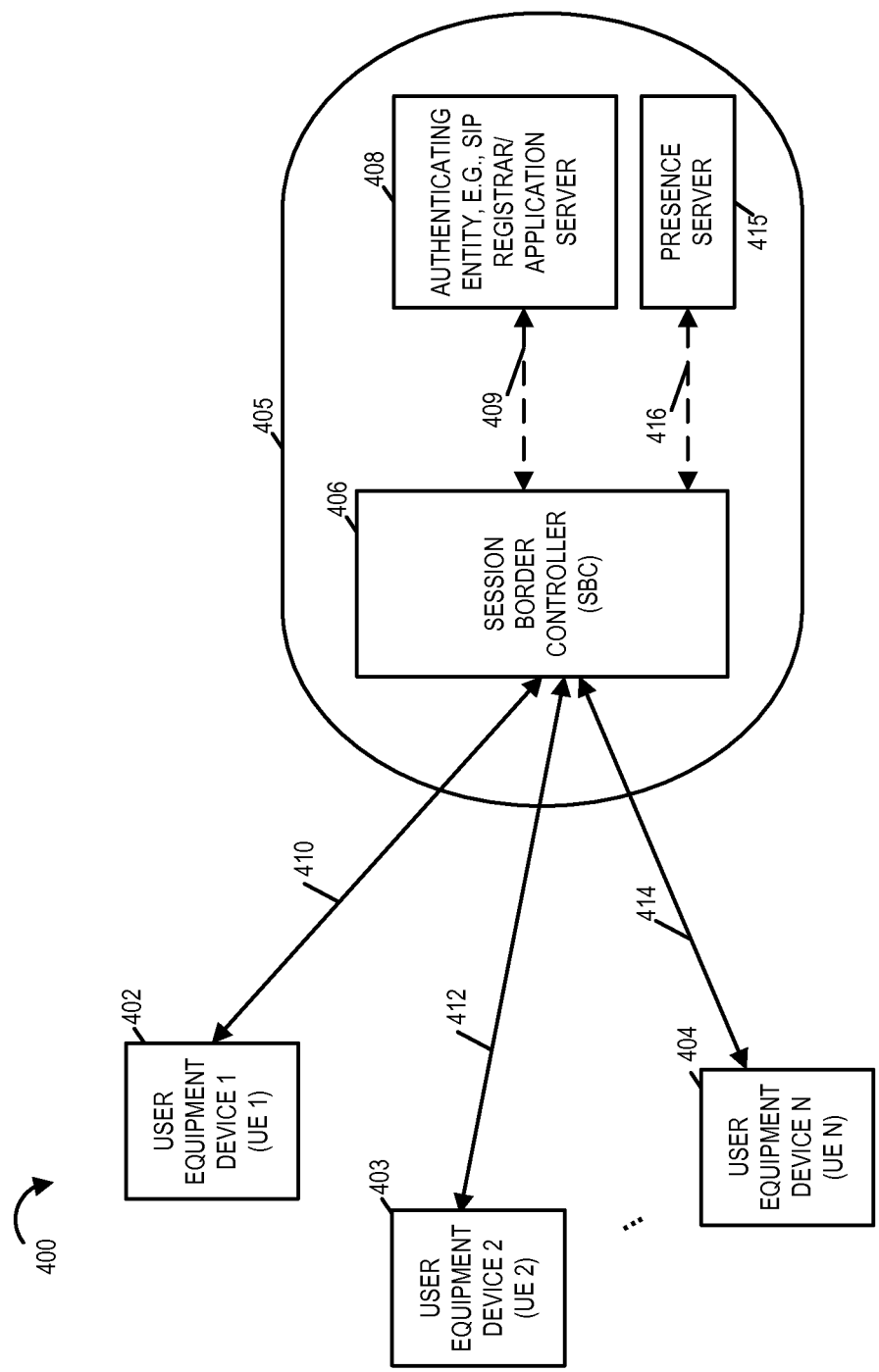
FIG. 4 illustrates an exemplary system implemented in accordance with an exemplary embodiment of the present invention.

FIG. 4 is a drawing of an exemplary communications system 400 in accordance with an exemplary embodiment. Exemplary communications system 400 includes a plurality of user equipment devices (user equipment device 1 (UE 1) 402, user equipment device 2 (UE 2) 403, . . . , user equipment device N (UE N) 404), a network 405 including a session border controller (SBC) 406, an authenticating entity 408, e.g., a SIP registrar/Application server, and a Presence Server 415. Each user device (402, 403, . . . , 404) is, e.g., a mobile or stationary communications device, that supports SIP signaling and is capable of communicating over an IP network. In various embodiments various user devices such as the ones shown in FIG. 4 include a SIP user agent. Each of the UE devices (402, 403, . . . , 404) are coupled to the SBC 406 via links (410, 412, . . . , 414), respectively. The SBC 406 is coupled to the authenticating entity 408 via link 409. The Presence Server 415 is coupled to the SBC 406 via link 416. Each of the user equipment devices (402, 403, . . . , 404) includes authentication credentials.

In some embodiments the exemplary session border controller (SBC) 406 and the authenticating entity 408, e.g., SIP registrar/Application server, are located at an operator/service provider's site. In various embodiments the devices in the system 400 communicate using TCP (Transmission Control Protocol).

In some embodiments, the SBC 406 is configured to store a response to a challenge, said response being communicated through the SBC from an entity with credentials, e.g., UE 1 402, to the authenticating entity 408, said response including authentication credentials. The SBC 406 is implemented in accordance with the present invention and is configured to generate an autonomous request, e.g., in response to a detected condition or event. In some embodiments, the generated autonomous request may, and sometimes does, includes authorization credentials from a previously stored response. In some embodiments, the SBC 406 is configured to implement methods to acquire authentications credentials, e.g., via a signaling exchange with an entity with authentication credentials, e.g., UE 1 402, and include the acquired credentials in an autonomous request sent to authenticating entity 408.

Figure 5A:
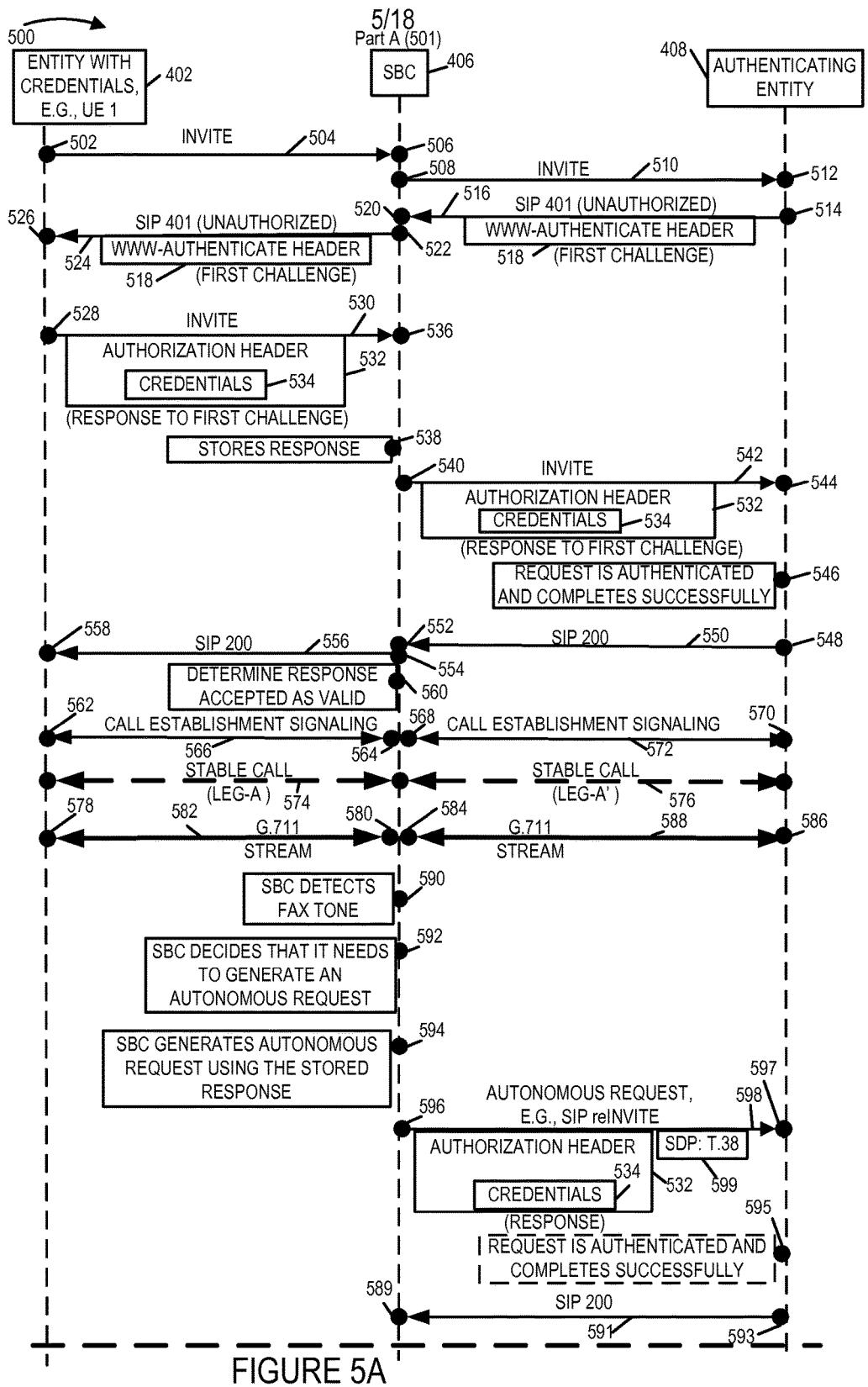
FIG. 5A illustrates a first part of exemplary steps and associated signaling exchanges between various devices, including an entity with authorization credentials, a session border controller and an authenticating entity, for supporting authentication for an autonomous request from an SBC in accordance with an exemplary embodiment.
Figures 5, 5A, 5B:
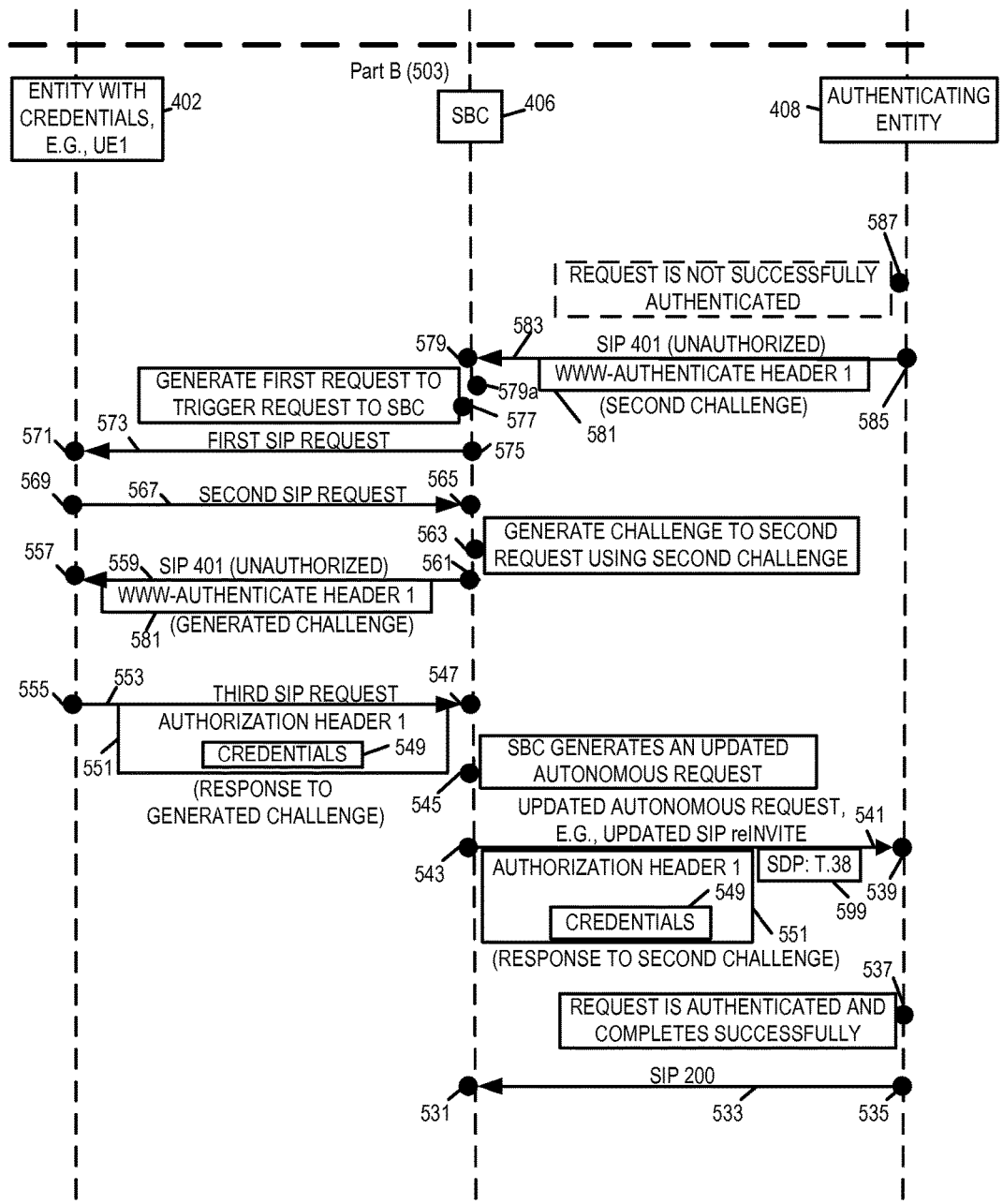
FIG. 5B illustrates a second part of exemplary steps and associated signaling exchanges between various devices, including an entity with authorization credentials, a session border controller and an authenticating entity, for supporting authentication for an autonomous request from and SBC in accordance with an exemplary embodiment.
FIG. 5 comprises the combination of FIG. 5A and FIG. 5B.

FIG. 5 illustrates an exemplary method in which a session border controller 406 acquires information to be included in an SBC generated autonomous request to allow the autonomous request to pass an authentication check being performed by authenticating entity 408. In some embodiments, optionally, the SBC 406 tries to make use of information used during an initial authentication process which involved both legs (574, 576). In some embodiments, during an initial authentication process, authenticate header information 518 and authorization header 532 information, which traversed the SBC 406 is stored to be available for possible future use by the SBC 406, e.g., inclusion in a SBC generated autonomous request to be sent to the authenticating entity 408. If the approach of using the previously stored information from an initial authentication process is not successful or if that option is not followed, the SBC 406 generates and sends a request triggering signal 573 to the entity with authentication credentials 402 to trigger a request, which is to be challenged by the SBC 406 and from which a response including a authorization header field is to be received by the SBC. The authorization header 551 information acquired from the entity with authorization credentials 402 via a process including request triggering signal 573 is included in a SBC generated autonomous request sent to the authenticating entity 408 to allow the autonomous request to pass an authentication check.

FIG. 5 will now be described in more detail. FIG. 5, comprising the combination of FIG. 5A and FIG. 5B, is a drawing 500, comprising Part A 501 and Part B 503, illustrates exemplary devices (an exemplary entity with credentials, e.g., UE 1 402, exemplary session border controller 406, exemplary authenticating entity 408, e.g., a SIP Registrar/Application Server) and exemplary signals flows in accordance with an exemplary method in accordance with some embodiments of the present invention.

Operation starts in step 502, in which the entity with credentials 402 generates and transmits an INVITE message 504. In step 504, SBC 406 receives INVITE 504. In response to the received INVITE 504, in step 508 the SBC generates and transmits INVITE 510 to authenticating entity 408. INVITE 510 is a forwarded version of INVITE 504. In step 512 the authenticating entity 408 receives INVITE 510.

In step 514 the authenticating entity 408 generates and transmits a SIP 401 message (Unauthorized) 516 including a WWW-Authenticate header 518, which is a first challenge. In step 520 the SBC receives SIP 401 message 516. In step 522, the SBC generates and transmits a SIP 401 (unauthorized) message 524 including the WWW-Authenticate header 518, which is the first challenge. SIP 401 message 524 is a forwarded version of SIP 401 message 516. In step 526 the entity with credentials 402 receives SIP 401 message 524. In step 526 the entity with credential 402, generates and transmits an INVITE 530, including an authorization header field 532. INVITE 530 is a SIP request message. The SIP request message is being sent to the authenticating entity 408 through the SBC 406, e.g., as part of the establishment of a Voice Over Internet Protocol call session. The authorization header field 532 is a response to the first challenge 518 and includes authentication credentials 534 for the entity with credentials 402. In step 536, the SBC 406 receives the invite message 530. In step 538, the SBC 406 stores the response to the first challenge, e.g., the authorization header field 532 including credentials 534.

In step 540, the SBC 406 generates and sends INVITE 542 including authorization header field 532 including credentials 534 to the authenticating entity 408. In step 544, the authenticating entity 408 receives INVITE 542. In step 546, the authenticating entity 408 performs authentication operations using the received response to the first challenge and determines that the request is authenticated and completes successfully. In step 548, in response to the successful authentication determination, the authenticating entity 408 generates and transmits a SIP 200 message 550. In step 552, the SBC 406 receives the SIP 200 message 552, and in response generates and transmits SIP 200 message 556, e.g., a forwarded version of message 550, which is received by the entity with credentials in step 558.

In step 560, based on the received SIP 200 message 550, the SBC 406 determines that the response has been accepted as valid by the authenticating entity 408.

In steps 562 and 564, the entity with credentials 402 and the SBC 406, are operated, respectively, to send and receive call establishment signals 566. In steps 568 and 650, the SBC 406 and the authenticating entity 408 are operated, respectively, to send and received call establishment signals 572. This results in a stable call being established. The stable call includes: stable call (Leg-A) 574 between the entity with credentials 402 and the SBC 406 and stable call (Leg-A') 576 between the SBC 406 and the authenticating entity 408.

In steps 578 and 580, the entity with credentials 402 and the SBC 406, are operated, respectively, to send and receive G.711 stream signals 582 over Leg-A 574. In steps 584 and 588, the SBC 406 and the authenticating entity 408 are operated, respectively, to send and receive G.711 stream signals 588 over Leg-A' 576. In some embodiments, configuration information known to the SBC 406 indicates that Leg-A can support G.711 but cannot support T.38 and further indicates that Leg-A' can support G.711 and T.38.

In step 590 the SBC 406 detects a FAX tone. In step 592, the SBC 406 decides that it needs to generate an autonomous request based on the detected FAX tone. In step 594 the SBC 406 generates an autonomous request, e.g., a SIP reINVITE, using the stored response, e.g., stored authorization header field 532 including credentials 534.

In step 596, the SBC 406 transmits the generated autonomous request 598 including authorization header field 532 including credentials 534 and information SDP:T.38 599, e.g., a parameter indicating the T.38 fax relay standard. In step 597 the authenticating entity 408 receives the autonomous request 598.

In a first scenario, in step 595 the authenticating entity 408 performs authentication operations on signal 598 using the received authentication header field 532 including credentials 534 and determines that the request is authenticated by the authenticating entity 408. In response to the successful authentication, the authenticating entity 408, in step 593 generates and transmits SIP 200 message 591. In step 589, the SBC 406 receives SIP 200 message 591 and recognizes that the authenticating entity 408 has accepted the response.

In a second scenario, the authenticating entity 408 performs authentication operations on signal 585 and determines that the request is not successfully authenticated by the authenticating entity 408, as indicated by 587 in FIG. 5B. There could be a number of possible reasons why the approach shown in steps of FIG. 5A was not successful resulting in the second scenario of a failure to authenticate SBC generated autonomous request 598. One possible reason is that the authenticating entity 408 does not support proactive insertion of Authorization headers to requests which are not yet challenged. Another possible reason is that the response used in the authorization header is considered "stale" by the authenticating entity 408 and the authenticating entity 408 still challenges the request. For example, the stored response included in the autonomous request 598 may no longer be valid, e.g., too much time has passed between when the response was stored in step 538 and when the stored response was included in the generated autonomous request, and thus the authenticating entity 408 determines that authentication has failed. Another possible reason is that the authentication algorithm which is used is making use of cnonce (a value generated by the authenticated entity 402) and the authenticating entity 408 expects/enforces a different cnonce value for each authorization attempt. If at least one of the above reasons is true, the SBC generated autonomous request 598 would be challenged and the procedure described below is followed. In the procedure described below the SBC 406 generates a request 573 toward the entity with credentials 402, which in turn triggers another request 567 off that entity 402 and the SBC 402 challenges request 567 with signal 559, said challenge request signal 567 including the challenge 581 previously received from the authenticating entity 408. Once the SBC receives the response from the entity with credentials 402, the SBC 406 adds that response, e.g., authorization header 1 551, to the autonomous request and resends the autonomous request to the authenticating entity 408, as updated autonomous request 541.

The approach illustrated in FIG. 5B will now be described in more detail. In response to the determination that the authentication was unsuccessful, the authenticating entity 408, generates and transmits as SIP 401 (unauthorized) message including WWW-Authenticate header 1 581, which is a second challenge. In step 579 the SBC 406 receives the SIP 401 message including the second challenge. In step 579a the SBC 406 stores the received WWW-Authenticate header 1 581.

In response to the received second challenge, in step 577 the SBC 406 generates a first request 573 to trigger a request to the SBC. In step 575, the SBC 406 sends the first SIP request 573 to the entity with credentials 402, said first SIP request 573 being a request that will trigger the entity with credentials 402 to generate and send a request to the SBC 406. In step 571 the entity with credentials 402 receives the first SIP request 573. In step 569, in response to the received first SIP request 573, the entity with credentials 402 generates and sends second SIP request 567, which is received by the SBC 406 in step 565.

In step 563, the SBC 406 generates a challenge to the second SIP request using the second challenge. In step 561 the SBC 406 sends a SIP 401 (unauthorized) message 559 including WWW-Authenticate header 1 581, which is a challenge. In step 557 the entity with credentials 402 receives the SIP 401 message 559 including the challenge 581. In step 555, in response to message 559 including the challenge, the entity with credentials 402 generates and sends a third SIP request 553 including authorization header 1 551 including authentication credentials 549 for the entity with credentials 402. In step 547 the SBC 406 receives the third SIP request 553, said third SIP request being in response to the generated challenge of step 563.

In step 545 the SBC 406 generates an updated autonomous request, e.g., an updated SIP reINVITE message 541. The updated autonomous request 541 includes authorization header field 1 551 including credentials 549 and SDP information: T.38 599. Authorization header 1 551 of updated autonomous request 541 is different from authorization header 532 of autonomous request 598. In step 543 the SBC 406 sends the updated autonomous request 541 to the authenticating entity 408. In step 539 the authenticating entity 408 receives the updated autonomous request 541 including the response to the second challenge. In step 537 the authenticating entity 408 performs authentication operations using the received response to the second challenge and determines that the request is successfully authenticated. Based on the successful authentication, in step 535 the authenticating entity generates and sends a SIP 200 message 533 which is received by the SBC 406 in step 531.

Figure 6A:
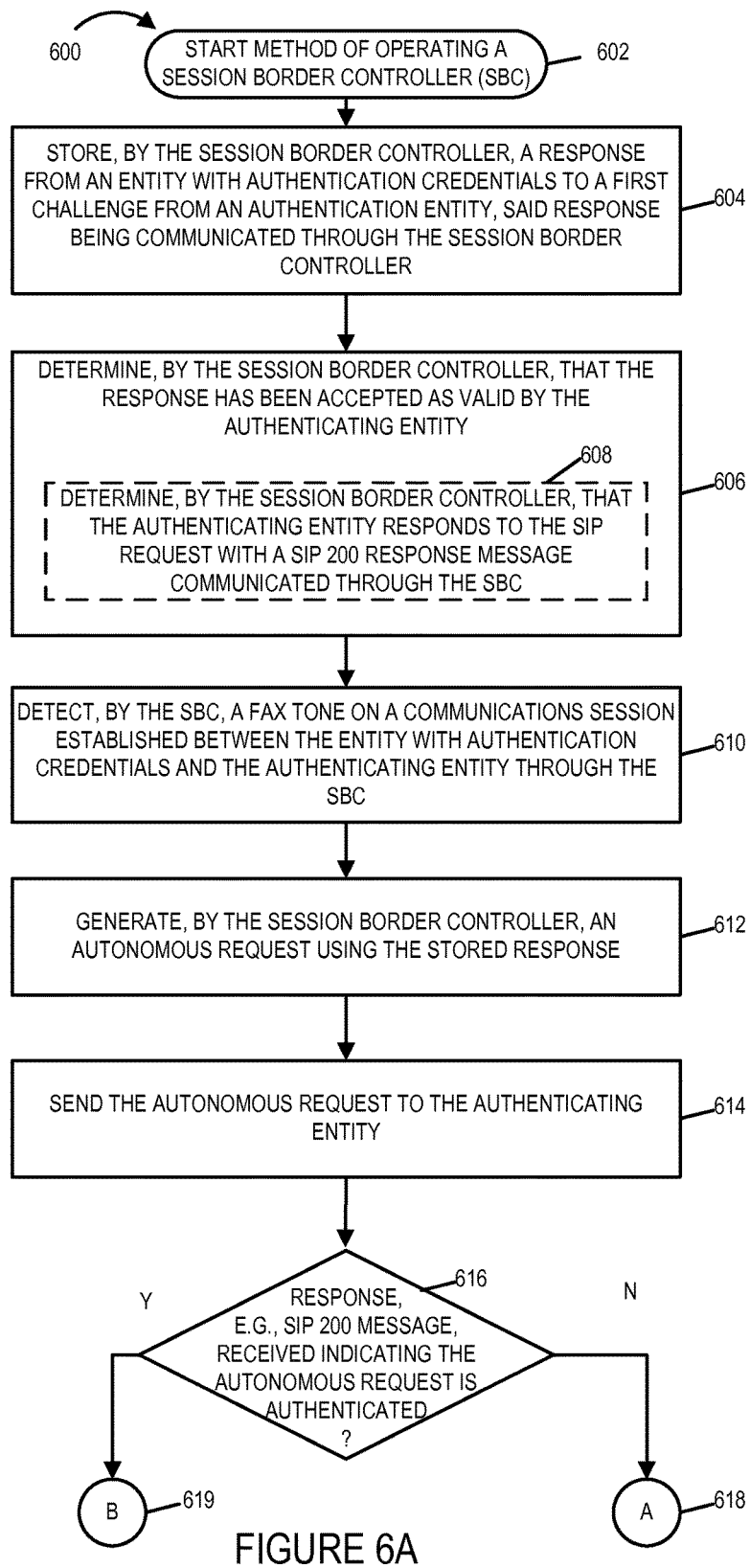
FIG. 6A illustrates a first part of a flowchart showing the steps of an exemplary method of operating a Session Border Controller (SBC) in accordance with various exemplary embodiments of the present invention.

FIG. 6, comprising the combination of FIG. 6A and FIG. 6B, is a flowchart 600 of an exemplary method of operating a session border controller (SBC), e.g., SBC 406, in accordance with various embodiments. Operation of the exemplary method starts in step 602 in which the session border controller is powered on and initialized. Operation proceeds from step 602 to step 604. In step 604, the SBC stores a response from an entity with authentication credentials, e.g., device 402, to a first challenge from an authentication entity, e.g., device 408, said response being communicated through the SBC. Operation proceeds from step 604 to step 606.

In step 606, the SBC determines that response has been accepted as valid by the authenticating entity. In some such embodiments, step 606 includes step 608 in which the SBC determines that the authenticating entity responded to the SIP request with a SIP 200 response message communicated through the SBC. Operation proceeds from step 606 to step 610.

In step 610, the SBC detects a fax tone on a communications session established between the entity with authentication credentials and the authenticating entity through the SBC. Operation proceeds from step 610 to step 612, in which the SBC generates an autonomous request using the stored response. In some embodiments using the stored response includes including at least a portion of the stored response in the autonomous request. In some such embodiments the stored response includes authentication credentials for the entity with authentication credentials. In some embodiments, the stored response is an authorization header.

In some embodiments, using the stored response includes adding the stored response to an autonomous request, e.g., adding the stored response to an autonomous request without an authorization header, said stored response being an authorization header.

In some embodiments, the response is included in a SIP request message sent from the entity with authentication credentials. In some such embodiments, the SIP request message is transmitted from the entity with credentials to the authenticating entity through the SBC as part of the establishment of a SIP dialog, SIP session, SIP registration, or Voice Over Internet Protocol call session.

In some embodiments, the autonomous request is part of a re-negotiation with the authentication entity to use a T.38 fax relay standard for a fax transmission. In some such embodiments, the autonomous request is a SIP reINVITE request including an SDP parameter indicating a T.38 fax relay standard. Operation proceeds from step 612 to step 614.

In step 614 the SBC sends the generated autonomous request to the authenticating entity. Operation proceeds from step 614 to step 616.

In step 616 the SBC determines whether or not a response, e.g., a SIP 200 message, was received indicating that the autonomous request is authenticated and controls operation as a function of the determination. If a response, e.g., a SIP 200 message, was received indicating that the autonomous request is authenticated, then operation proceeds from step 616, via connecting node B 619, to step 638. However, if a successful response, e.g., a SIP 200 message was not received, indicating that the autonomous request is not successfully authenticated, then operation proceeds from step 616, via connecting node A 618, to step 620.

In step 620 the SBC receives from the authenticating entity in response to the autonomous request, a second challenge. Operation proceeds from step 620 to step 622. In step 622 the SBC sends a first request to the entity with authentication credentials, said first request being a request that will trigger an entity receiving the request to generate and send a request to the SBC. In some embodiments, the first request, which is a request triggering signal, is one of: a SIP SUBSCRIBE request, a SIP NOTIFY request, and a SIP REFER request. Operation proceeds from step 622 to step 624.

In step 624 the SBC receives a second request from the entity with authentication credentials in response to the first request sent by the SBC. In some embodiments, the first request is a SIP REFER request, and the second request is a SIP NOTIFY request. In some embodiments, the first request is a SIP NOTIFY request and the second request is a SUP SUBSCRIBE request. In some embodiments, the first request is a SIP SUBSCRIBE request and the second request is a SIP NOTIFY request. Operation proceeds from step 624 to step 626.

In step 626 the SBC generates a challenge to the second request using the second challenge. Operation proceeds from step 626 to step 628.

In step 628 the SBC sends, to the entity with authentication credentials, the generated challenge. Operation proceeds from step 628 to step 630.

In step 630 the SBC receives from the entity with credentials, a third request in response to the generated challenge, said third request including a response to the generated challenge. In some embodiments, the third request including the response to the generated challenge includes an authorization header. Operation proceeds from step 630 to step 632.

In step 632 the SBC updates said autonomous request using the response to generated challenge received from the entity with authentication credentials, e.g., the SBC includes the received authorization header received in step 630 in the updated autonomous request. Operation proceeds from step 632 to step 634.

In step 634 the SBC sends the updated autonomous request to the authenticating entity. Operation proceeds from step 634 to step 636 in which the SBC receives a response, e.g., a SIP 200 message, indicating that the updated autonomous request is authenticated. Operation proceeds from step 636 to step 638 in which the SBC performs operations consistent with successful completion of the autonomous request to support FAX signaling, e.g., transcode between G.711 and T.38 since one call leg does not support T.38.

Figure 7:
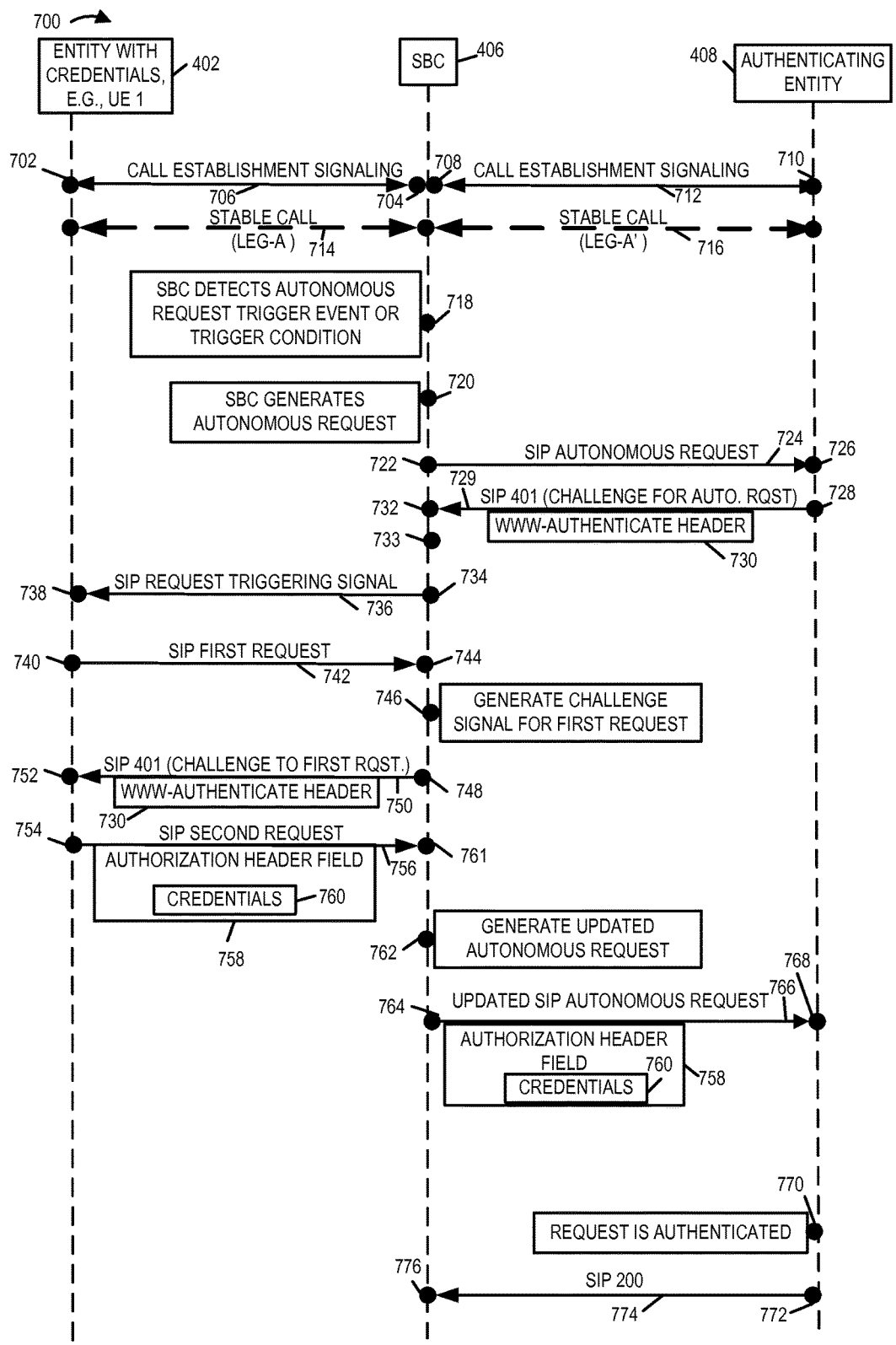
FIG. 7 illustrates exemplary steps and associated signaling exchanges between various devices, including an entity with authorization credentials, a session border controller and an authenticating entity, for supporting authentication for an autonomous request from an SBC in accordance with another exemplary embodiment.

FIG. 7 is a drawing 700 illustrates exemplary devices (an exemplary entity with authentication credentials, e.g., UE 1 402, exemplary session border controller (SBC) 406, exemplary authenticating entity 408, e.g., a SIP Registrar/Application Server) and exemplary signal flows in accordance with an exemplary method in accordance with some embodiments of the present invention.

In steps 702 and 704, the entity with credentials 402 and the SBC 406, are operated, respectively, to send and receive call establishment signals 706. In steps 708 and 710, the SBC 406 and the authenticating entity 408 are operated, respectively, to send and received call establishment signals 712. This results in a stable call being established. The stable call includes: stable call (Leg-A) 714 between the entity with credentials 402 and the SBC 406 and stable call (Leg-A') 716 between the SBC 406 and the authenticating entity 408. Thus, via steps 704 and 708, the SBC 406 is operated to couple the entity with credentials 402 to the authenticating entity 408 through the SBC 406, and is operated to establish a communications session between the entity with authentication credentials 402 and the authenticating entity.

In step 718 the SBC 406 detects an autonomous request trigger event or trigger condition. As a result of the detection of step 718, the SBC 406 generates a SIP autonomous request 724 in step 720. In step 722 the SBC 706 sends the generated SIP autonomous request 724 to the authenticating entity 408. In step 726 the authenticating entity 408 receives the autonomous request 724. In step 728 the authenticating entity 404, generates and sends a SIP 401 message 729, which is a challenge message in response to the received autonomous request message. The SIP 401 message 729 includes WWW-Authenticate header 730, which includes a challenge in response to the autonomous request 724. In step 732 the SBC 406 receives the SIP 401 message 732 including the challenge in response the autonomous request 724. In step 733 the SBC 706 stores the received WWW-Authenticate header 730.

In step 734, the SBC 406 generates and sends a SIP request triggering signal 736 to the entity with authentication credentials 402, said request triggering signal triggering an entity receiving the signal to generate and send a request to the SBC 406. In some embodiments, the SIP request triggering signal 736 is one of a SIP REFER request, a SIP NOTIFY request, or a SIP SUBSCRIBE request. In step 738 the entity with credentials 402 receives the SIP request triggering signal 736.

In step 740, in response to the received request triggering signal 736 the entity with credentials 402 is triggered to generate and send a first SIP request 742 to the SBC 406. In some embodiments, the SIP request triggering signal 736 is a SIP SUBSCRIBE request for an event package, that the entity with credentials 402 supports, and the first SIP request 742 is a SIP NOTIFY request. In step 744, the SBC receives the SIP first request 742 from the entity with authentication credentials 402. In step 746 the SBC 406 generates a challenge signal 752 to the first request using the challenge received from the authenticating entity 408. In step 748 the SBC 406 sends generated SIP 401 message 750, which is a challenge signal corresponding to the first request. SIP 401 signal 750 includes WWW-Authenticate header 730, which is the challenge previously received from the authenticating entity 408.

In step 752 the entity with credentials 402 receives the SIP 401 signal 750, which is a challenge signal corresponding to the first request signal 742.

In step 754 the entity with authentication credentials 402 generates and sends a SIP second request 756 to the SBC 406. In some embodiments, the second SIP second request 756 is the first SIP request 742 updated to include a response to the generated challenge. The SIP second request 756 includes an authorization header field 758 including authorization credentials 760 for the entity with authentication credentials 402. In some embodiments, the authentication credentials are the authentication header. The SIP second request 756 is a response to the SIP 401 message communicating the challenge.

In step 761 the SBC 406 receives the SIP second request 756 from the entity with authentication credentials, the SIP second request 756 being in response to the generated challenge of step 746, said SIP second request 756 including a response to the generated challenge, the response being authorization header field 758 including credentials 760.

In step 762, the SBC 406 generates an updated autonomous request using the response to the generated challenge received from the entity with authentication credentials 402. In step 764 the SBC 406 sends the updated autonomous request 766 to the authenticating entity 408. The updated SIP autonomous request 766 includes authorization header field 758 including authorization credentials 760.

In step 768 the authenticating entity 408 receives the updated SIP autonomous request 766. In step 770 the authenticating entity 408 performs authenticating operations using the received authorization header 758 and determines that the updated autonomous request is authenticated. In step 772 the authenticating entity 408 generates and sends a SIP 200 message 774 to the SBC 406, which is received by the SBC in step 776.

Figure 7A:
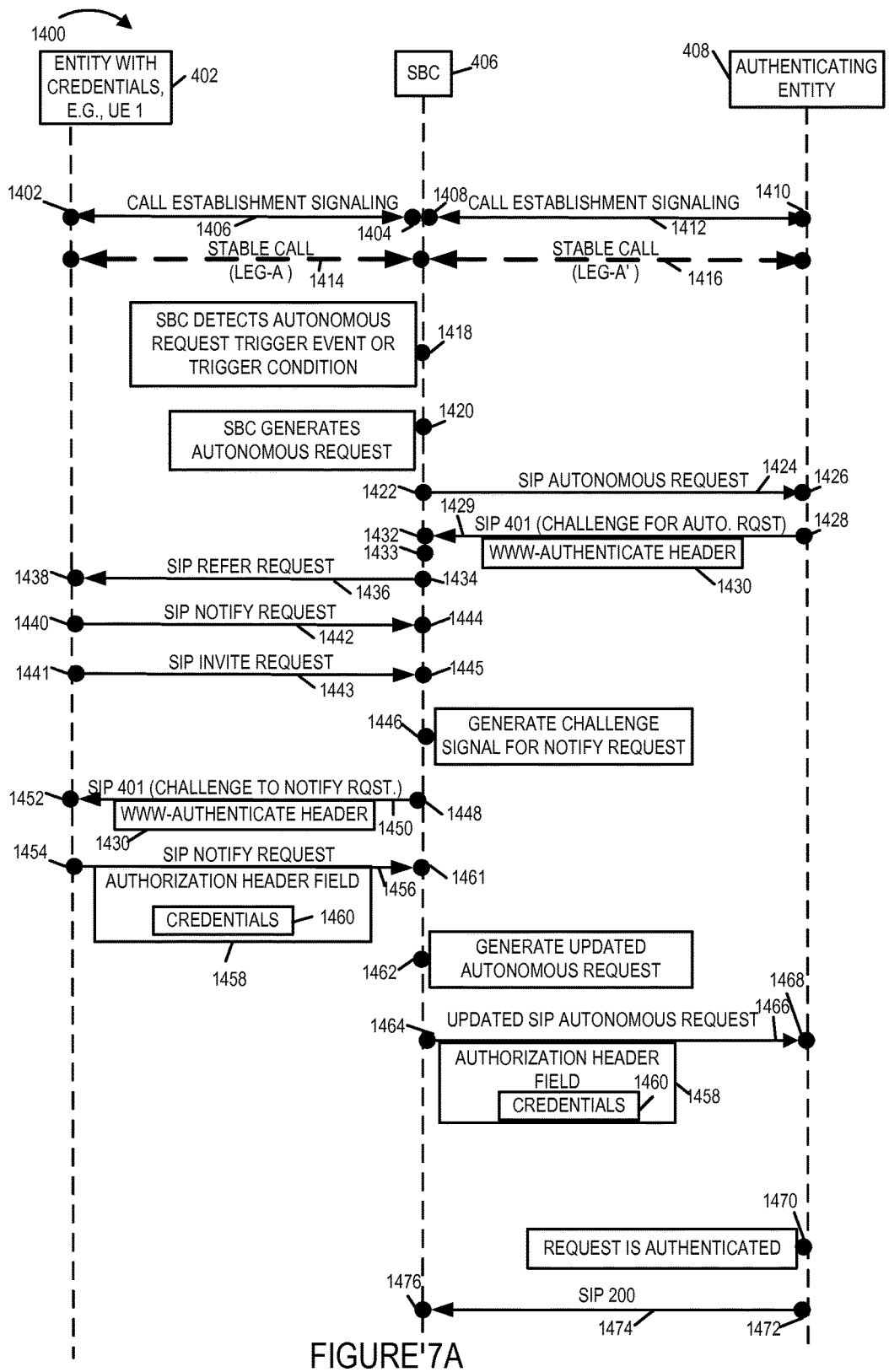
FIG. 7A illustrates exemplary steps and associated signaling exchanges between various devices, including an entity with authorization credentials, a session border controller and an authenticating entity, for supporting authentication for an autonomous request from an SBC in accordance with an exemplary embodiment in which a SBC generated REFER request is used as a request triggering signal.

FIG. 7A is a drawing 1400 illustrates exemplary devices (an exemplary entity with authentication credentials, e.g., UE 1 402, exemplary session border controller (SBC) 406, exemplary authenticating entity 408, e.g., a SIP Registrar/Application Server) and exemplary signal flows in accordance with an exemplary method in accordance with some embodiments of the present invention. In the example of FIG. 7A, the SBC generates and sends a REFER request 1436, as the triggering signal, to the entity with credentials 402 to trigger a NOTIFY request 1442 and an INVITE request 1443 off the entity with credentials 402. The SBC 406 generates a challenge message 1450 to one of the NOTIFY and INVITE requests (1442, 1443). The generated challenge message 1450 uses, e.g., includes, the challenge information WWW-Authenticate header 1430 previously received in challenge message 1429, which was a challenge by the authenticating entity 408 to SBC generated autonomous request 1424. The response message 1456 received from the entity with credentials 402 in response to the generated challenge message 1450 is used by the SBC 406 to generate an updated autonomous request message 1466, e.g., received authorization header field 1456 is added to the autonomous request 1424 to generate an updated autonomous request 1466.

FIG. 7A will now be described in more detail. In steps 1402 and 1404, the entity with credentials 402 and the SBC 406, are operated, respectively, to send and receive call establishment signals 1406. In steps 1408 and 1410, the SBC 406 and the authenticating entity 408 are operated, respectively, to send and receive call establishment signals 1412. This results in a stable call being established. The stable call includes: stable call (Leg-A) 1414 between the entity with credentials 402 and the SBC 406 and stable call (Leg-A') 1416 between the SBC 406 and the authenticating entity 408. Thus, via steps 704 and 708, the SBC 406 is operated to couple the entity with credentials 402 to the authenticating entity 408 through the SBC 406, and is operated to establish a communications session between the entity with authentication credentials 402 and the authenticating entity.

In step 1418 the SBC 406 detects an autonomous request trigger event or trigger condition. As a result of the detection of step 1418, the SBC 406 generates a SIP autonomous request 1424 in step 1420. In step 1422 the SBC 706 sends the generated SIP autonomous request 1424 to the authenticating entity 408. In step 1426 the authenticating entity 408 receives the autonomous request 1424. In step 1428 the authenticating entity 404, generates and sends a SIP 401 message 1429, which is a challenge message in response to the received autonomous request message. The SIP 401 message 1429 includes WWW-Authenticate header 1430, which includes a challenge in response to the autonomous request 1424. In step 1432 the SBC 406 receives the SIP 401 message 1432 including the challenge in response the autonomous request 1424. In step 1433 the SBC 406 stores the received WWW-Authenticate header 1430.

In step 1434, the SBC 406 generates and sends a SIP REFER request 1436, which is a request triggering signal, to the entity with authentication credentials 402, said REFER request signal 1436 triggering an entity receiving the signal to generate and send a NOTIFY request and a INVITE request to the SBC 406. In step 738 the entity with credentials 402 receives the SIP REFER request signal 1436.

In step 1440, in response to the received SIP REFER request signal 1436 the entity with credentials 402 is triggered to generate and send SIP notify request 1442 to the SBC 406. In step 1441, in response to the received SIP REFER request signal 1436 the entity with credentials 402 is triggered to generate and send SIP INVITE request 1443 to the SBC 406. In step 1444, the SBC receives the SIP REFER request 1442 from the entity with authentication credentials 402. In step 1445, the SBC receives the SIP INVITE request 1443 from the entity with authentication credentials 402. In step 1446 the SBC 406 generates a challenge signal 1452 to the NOTIFY request using the challenge received from the authenticating entity 408. Alternatively, the SBC 406 could have generated a challenge signal to the INVITE request using the challenge received from the authenticating entity 408. In step 1448 the SBC 406 sends generated SIP 401 message 1450, which is a challenge signal corresponding to the NOTIFY request. SIP 401 signal 1450 includes WWW-Authenticate header 1430, which is the challenge previously received from the authenticating entity 408.

In step 1452 the entity with credentials 402 receives the SIP 401 signal 1450, which is a challenge signal corresponding to the SIP NOTIFY request signal 1442.

In step 1454 the entity with authentication credentials 402 generates and sends a SIP NOTIFY request 1456 to the SBC 406. In some embodiments, the SIP NOTIFY request 1456 is the SIP NOTIFY request 1442 updated to include a response to the generated challenge. The SIP NOTIFY request 1456 includes an authorization header field 1458 including authorization credentials 1460 for the entity with authentication credentials 402. In some embodiments, the authentication credentials are the authorization header. The SIP NOTIFY request 1456 is a response to the SIP 401 message 1450 communicating the challenge.

In step 1461 the SBC 406 receives the SIP NOTIFY request 1456 from the entity with authentication credentials, the SIP NOTIFY request 756 being in response to the generated challenge of step 1446, said SIP NOTIFY request 1456 including a response to the generated challenge, the response being authorization header field 1458 including credentials 1460.

In step 1462, the SBC 406 generates an updated autonomous request using the response to the generated challenge received from the entity with authentication credentials 402. In step 1464 the SBC 406 sends the updated autonomous request 1466 to the authenticating entity 408. The updated SIP autonomous request 1466 includes authorization header field 1458 including authorization credentials 1460.

In step 1468 the authenticating entity 408 receives the updated SIP autonomous request 1466. In step 1470 the authenticating entity 408 performs authenticating operations using the received authorization header 1458 and determines that the updated autonomous request is authenticated. In step 1472 the authenticating entity 408 generates and sends a SIP 200 message 1474 to the SBC 406, which is received by the SBC in step 1476.

Figure 7B:
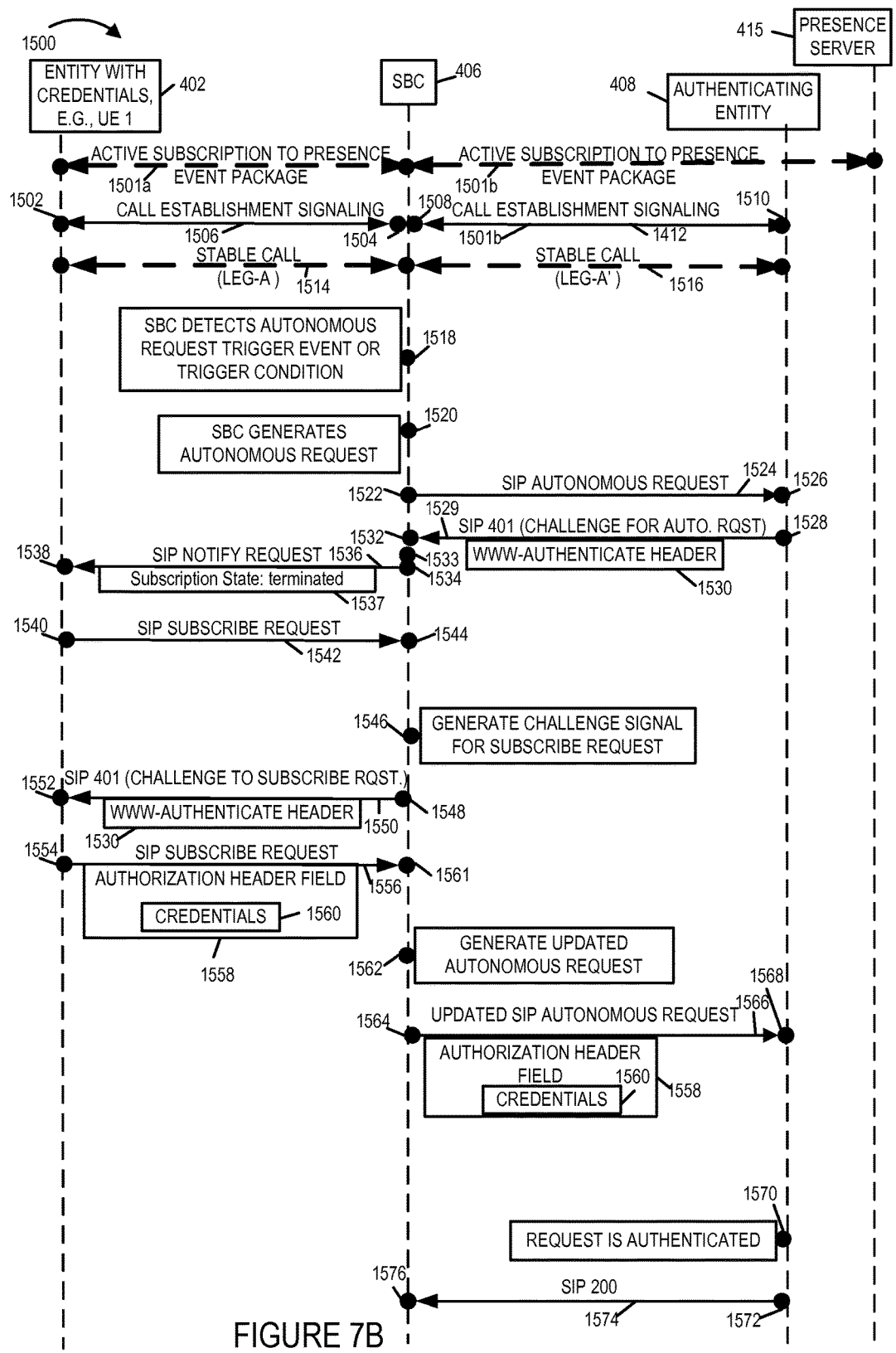
FIG. 7B illustrates exemplary steps and associated signaling exchanges between various devices, including an entity with authorization credentials, a session border controller and an authenticating entity, for supporting authentication for an autonomous request from an SBC in accordance with an exemplary embodiment in which a SBC generated NOTIFY request is used as a request triggering signal.
Figure 7C:
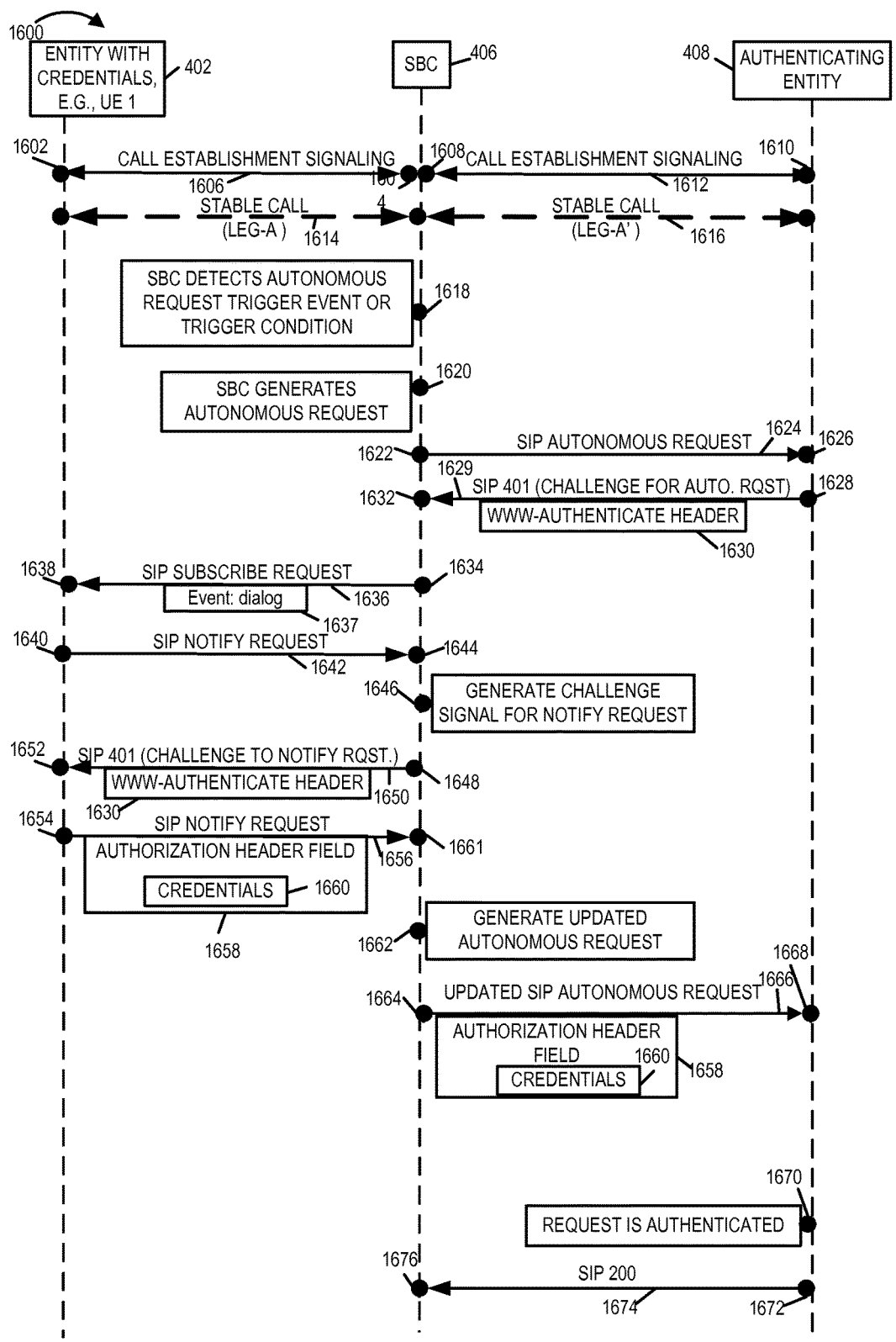
FIG. 7C illustrates exemplary steps and associated signaling exchanges between various devices, including an entity with authorization credentials, a session border controller and an authenticating entity, for supporting authentication for an autonomous request from an SBC in accordance with an exemplary embodiment in which a SBC generated SUBSCRIBE request is used as a request triggering signal.

FIG. 7B is a drawing 1500 illustrates exemplary devices (an exemplary entity with authentication credentials, e.g., UE 1 402, exemplary session border controller (SBC) 406, exemplary authenticating entity 408, e.g., a SIP Registrar/Application Server, a Presence Server 415) and exemplary signal flows in accordance with an exemplary method in accordance with some embodiments of the present invention. In the example of FIG. 7B, the SBC 406 uses an existing subscription previously initialed by the entity with credentials 402, e.g., a subscription to a Presence Server 415 going through SBC 406. In the example of FIG. 7C, the SBC generates and sends a NOTIFY request 1536 to artificially terminate the subscription, as the triggering signal, to the entity with credentials 402 to trigger a SUBSCRIBE request 1542 off the entity with credentials 402. The SBC 406 generates a challenge message 1550 to the SUBSCRIBE request 1542. The generated challenge message 1550 uses, e.g., includes, the challenge information WWW-Authenticate header 1530 previously received in challenge message 1529, which was a challenge by the authenticating entity 408 to SBC generated autonomous request 1524. The response message 1556 received from the entity with credentials 402 in response to the generated challenge message 1550 is used by the SBC 406 to generate an updated autonomous request message 1566, e.g., received authorization header field 1556 is added to the autonomous request 1524 to generate an updated autonomous request 1566.

FIG. 7B will now be described in more detail. The entity with authentication credentials 402 has an active subscription to a presence server event package as indicated by arrows 1501a, 1501b. The subscription to the Presence server 414 goes through the SBC 406 and the active subscription was previously initiated by the entity with credentials 402.

In steps 1502 and 1504, the entity with credentials 402 and the SBC 406, are operated, respectively, to send and receive call establishment signals 1506. In steps 1508 and 1510, the SBC 406 and the authenticating entity 408 are operated, respectively, to send and received call establishment signals 1512. This results in a stable call being established. The stable call includes: stable call (Leg-A) 1514 between the entity with credentials 402 and the SBC 406 and stable call (Leg-A') 1516 between the SBC 406 and the authenticating entity 408. Thus, via steps 1504 and 1508, the SBC 406 is operated to couple the entity with credentials 402 to the authenticating entity 408 through the SBC 406, and is operated to establish a communications session between the entity with authentication credentials 402 and the authenticating entity.

In step 1518 the SBC 406 detects an autonomous request trigger event or trigger condition. As a result of the detection of step 1518, the SBC 406 generates a SIP autonomous request 1524 in step 1520. In step 1522 the SBC 406 sends the generated SIP autonomous request 1524 to the authenticating entity 408. In step 1526 the authenticating entity 408 receives the autonomous request 1524. In step 1528 the authenticating entity 408, generates and sends a SIP 401 message 1529, which is a challenge message in response to the received autonomous request message. The SIP 401 message 1529 includes WWW-Authenticate header 1530, which includes a challenge in response to the autonomous request 1524. In step 1532 the SBC 406 receives the SIP 401 message 1532 including the challenge in response the autonomous request 1524. In step 1533 the SBC 406 stores the received WWW-Authenticate header 1530.

In step 1534, the SBC 406 generates and sends a SIP NOTIFY request 1536 with information indicating Subscription-State: "terminated" 1537, the SIP NOTIFY request 1536 being request triggering signal, to the entity with authentication credentials 402, said SIP NOTIFY request signal 1538 triggering an entity receiving the signal to generate and send a SIP SUBSCRIBE request to the SBC 406, which is a new SUBSCRIBE request to subscribe to the Presence Server event package. In step 1538 the entity with credentials 402 receives the SIP NOTIFY request signal 1536.

In step 1540, in response to the received SIP NOTIFY signal 1536 the entity with credentials 402 is triggered to generate and send SIP SUBSCRIBE request 1542 to the SBC 406. In step 1544, the SBC receives the SIP SUBSCRIBE request 1542 from the entity with authentication credentials 402. In step 1546 the SBC 406 generates a challenge signal 1552 to the SIP SUBSCRIBE request 1542 using the challenge received from the authenticating entity 408. In step 1548 the SBC 406 sends generated SIP 401 message 1550, which is a challenge signal corresponding to the SIP SUBSCRIBE request 1542. SIP 401 signal 1550 includes WWW-Authenticate header 1530, which is the challenge previously received from the authenticating entity 408.

In step 1552 the entity with credentials 402 receives the SIP 401 signal 1550, which is a challenge signal corresponding to the SIP SUBSCRIBE request signal 1542.

In step 1554 the entity with authentication credentials 402 generates and sends SIP SUBSCRIBE request 1556 to the SBC 406. In some embodiments, the second SIP SUBSCRIBE request 1556 is the first SIP SUBSCRIBE request 1542 updated to include a response to the generated challenge. The SIP SUBSCRIBE request 1556 includes an authorization header field 758 including authentication credentials 1560 for the entity with authentication credentials 402. In some embodiments, the authentication credentials 402 are the authorization header. The SIP second SUBSCRIBE request 1556 is a response to the SIP 401 message 1550 communicating the challenge.

In step 1561 the SBC 406 receives the SIP SUBSCRIBE request 1556 from the entity with authentication credentials, the SIP SUBSCRIBE request 1556 being in response to the generated challenge of step 1546, said SIP SUBSCRIBE request 1556 including a response to the generated challenge, the response being authorization header field 1558 including credentials 1560.

In step 1562, the SBC 406 generates an updated autonomous request using the response to the generated challenge received from the entity with authentication credentials 402. In step 1564 the SBC 406 sends the updated autonomous request 1566 to the authenticating entity 408. The updated SIP autonomous request 1566 includes authorization header field 1558 including authorization credentials 1560.

In step 1568 the authenticating entity 408 receives the updated SIP autonomous request 1566. In step 1570 the authenticating entity 408 performs authenticating operations using the received authorization header 1558 and determines that the updated autonomous request is authenticated. In step 1572 the authenticating entity 408 generates and sends a SIP 200 message 1574 to the SBC 406, which is received by the SBC in step 1576.

FIG. 7C is a drawing 1600 illustrates exemplary devices (an exemplary entity with authentication credentials, e.g., UE 1 402, exemplary session border controller (SBC) 406, exemplary authenticating entity 408, e.g., a SIP Registrar/Application Server) and exemplary signal flows in accordance with an exemplary method in accordance with some embodiments of the present invention. In the example of FIG. 7C, the SBC 406 creates a subscription toward the entity with credentials 402. In the example of FIG. 7C, the SBC generates and sends a SUBSCRIBE request 1636 for an event package it supports, e.g., a dialog event state package, as the triggering signal, to the entity with credentials 402 to trigger an immediate NOTIFY request 1642 off the entity with credentials 402. The SBC 406 generates a challenge message 1650 to the NOTIFY request 1642. The generated challenge message 1650 uses, e.g., includes, the challenge information WWW-Authenticate header 1630 previously received in challenge message 1629, which was a challenge by the authenticating entity 408 to SBC generated autonomous request 1624. The response message 1656 received from the entity with credentials 402 in response to the generated challenge message 1650 is used by the SBC 406 to generate an updated autonomous request message 1666, e.g., received authorization header field 1656 is added to the autonomous request 1624 to generate an updated autonomous request 1666.

FIG. 7C will now be described in more detail. In steps 1602 and 1604, the entity with credentials 402 and the SBC 406, are operated, respectively, to send and receive call establishment signals 1606. In steps 1608 and 1610, the SBC 406 and the authenticating entity 408 are operated, respectively, to send and received call establishment signals 1612. This results in a stable call being established. The stable call includes: stable call (Leg-A) 1614 between the entity with credentials 402 and the SBC 406 and stable call (Leg-A') 1616 between the SBC 406 and the authenticating entity 408. Thus, via steps 1604 and 1608, the SBC 406 is operated to couple the entity with credentials 402 to the authenticating entity 408 through the SBC 406, and is operated to establish a communications session between the entity with authentication credentials 402 and the authenticating entity 408.

In step 1618 the SBC 406 detects an autonomous request trigger event or trigger condition. As a result of the detection of step 1618, the SBC 406 generates a SIP autonomous request 1624 in step 1620. In step 1622 the SBC 406 sends the generated SIP autonomous request 1624 to the authenticating entity 408. In step 1626 the authenticating entity 408 receives the autonomous request 1624. In step 1628 the authenticating entity 404, generates and sends a SIP 401 message 1629, which is a challenge message in response to the received autonomous request message. The SIP 401 message 1629 includes WWW-Authenticate header 1630, which includes a challenge in response to the autonomous request 1624. In step 1632 the SBC 406 receives the SIP 401 message 1632 including the challenge in response the autonomous request 1624.

In step 1634, the SBC 406 generates and sends a SIP SUBSCRIBE request signal 1636, which is a request triggering signal, to the entity with authentication credentials 402, said SIP SUBSCRIBE request signal 1636 including credentials for an event package it supports, e.g., dialog event state package 1637, said SIP SUBSCRIBE request signal 1636 triggering an entity receiving the signal to generate and send a NOTIFY request to the SBC 406. In step 1638 the entity with credentials 402 receives the SIP SUBSCRIBE request signal 1636.

In step 1640, in response to the received SUBSCRIBE request signal 1636 the entity with credentials 402 is triggered to generate and send a SIP NOTIFY request 1642 to the SBC 406. In step 1644, the SBC receives the SIP NOTIFY request 1642 from the entity with authentication credentials 402. In step 1646 the SBC 406 generates a challenge signal 1652 to the NOTIFY request 1642 using the challenge received from the authenticating entity 408. In step 1648 the SBC 406 sends generated SIP 401 message 1650, which is a challenge signal corresponding to the SIP NOTIFY request 1642. SIP 401 signal 1650 includes WWW-Authenticate header 1630, which is the challenge previously received from the authenticating entity 408.

In step 1652 the entity with credentials 402 receives the SIP 401 signal 1650, which is a challenge signal corresponding to the NOTIFY request signal 1642.

In step 1654 the entity with authentication credentials 402 generates and sends a SIP NOTIFY request 1556 to the SBC 406. In some embodiments, the second SIP NOTIFY request 1656 is the first SIP NOTIFY request 1642 updated to include a response to the generated challenge. The SIP NOTIFY request 1656 includes an authorization header field 1658 including authorization credentials 1660 for the entity with authentication credentials 402. In some embodiments, the authentication credentials are the authorization header. The SIP second NOTIFY request 1656 is a response to the SIP 401 message 1650 communicating the challenge.

In step 1661 the SBC 406 receives the SIP NOTIFY request 1656 from the entity with authentication credentials, the SIP NOTIFY request 1656 being in response to the generated challenge of step 1646, said SIP NOTIFY request

1656 including a response to the generated challenge, the response being authorization header field 1658 including credentials 1660.

In step 1662, the SBC 406 generates an updated autonomous request using the response to the generated challenge received from the entity with authentication credentials 402. In step 1664 the SBC 406 sends the updated autonomous request 1666 to the authenticating entity 408. The updated SIP autonomous request 1666 includes authorization header field 1658 including authorization credentials 1660.

In step 1668 the authenticating entity 408 receives the updated SIP autonomous request 1666. In step 1670 the authenticating entity 408 performs authenticating operations using the received authorization header 1658 and determines that the updated autonomous request is authenticated. In step 1672 the authenticating entity 408 generates and sends a SIP 200 message 1674 to the SBC 406, which is received by the SBC in step 1676.

Figure 8:
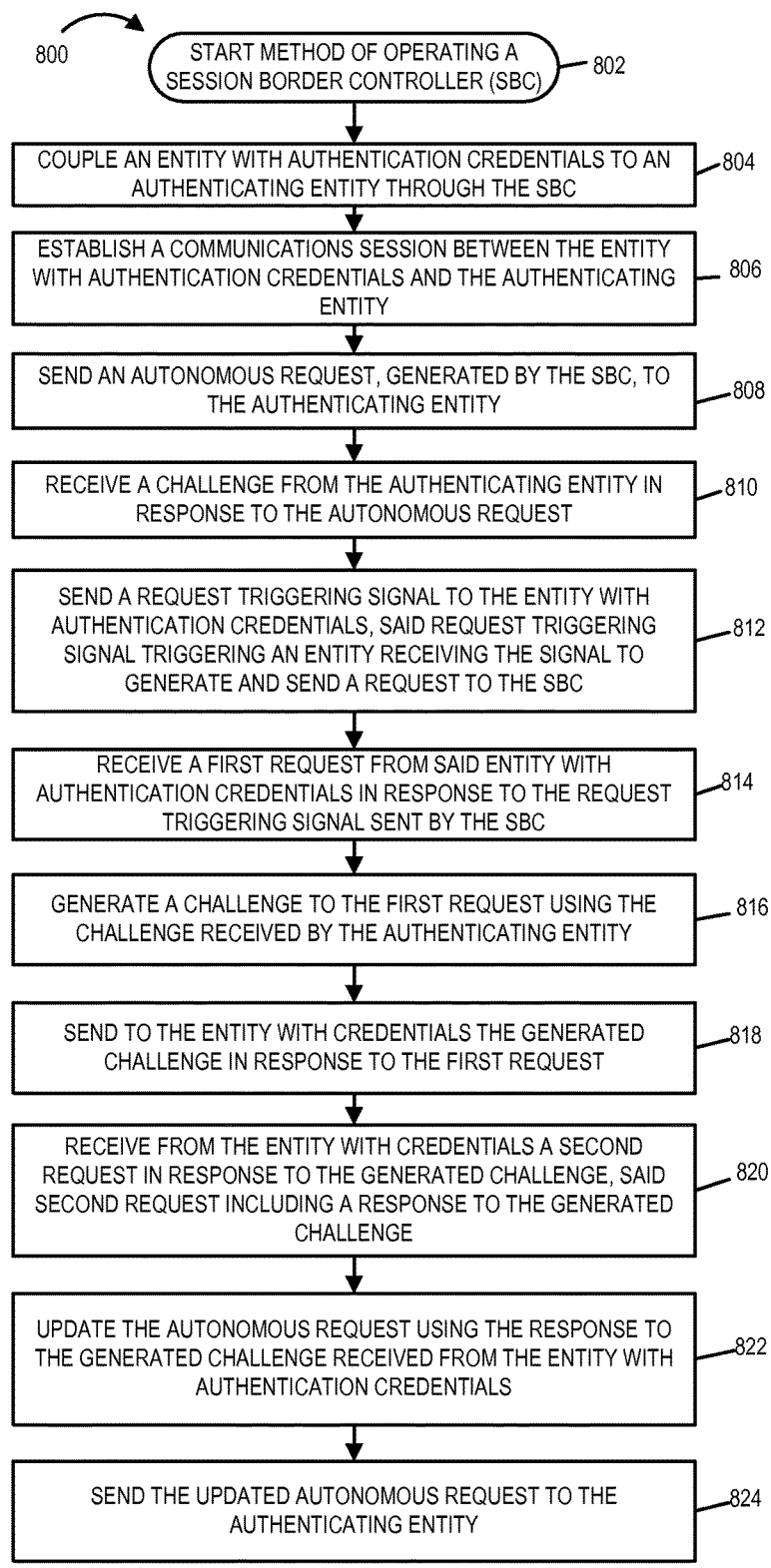
FIG. 8 illustrates a flowchart showing the steps of an exemplary method of operating a Session Border Controller (SBC) in accordance with various exemplary embodiments of the present invention.

FIG. 8 is a flowchart 800 of an exemplary method operating a session border controller (SBC), e.g., device 406, in accordance with various embodiments. Operation of the exemplary method starts in step 802 in which the SBC is powered on and initialized. Operation proceeds from step 802 to step 804 in which the SBC couples and entity with authentication credentials, e.g., device 402, to an authenticating entity, e.g., device 408, through the SBC. Operation proceeds from step 804 to step 806.

In step 806 the SBC establishes a communications session between the entity with authentication credentials, e.g., device 402, and the authenticating entity, e.g., device 408. Operation proceeds from step 806 to step 808. In step 808 the SBC sends an autonomous request, generated by the SBC to the authenticating entity. Operation proceeds from step 808 to step 810.

In step 810 the SBC receives a challenge from the authenticating entity in response to the autonomous request. Operation proceeds from step 810 to step 812.

In step 812 the SBC sends a request triggering signal to the entity with authentication credentials, said request triggering signal triggering and entity receiving the signal to generate and send a request to the SBC. In some embodiments, the request triggering signal is one of: a SIP REFER request, a SIP NOTIFY request or a SIP SUBSCRIBE request. Operation proceeds from step 812 to step 814.

In step 814 the SBC receives a first request from the entity with authentication credentials in response to the request triggering signal sent by the SBC. In some embodiments, the request triggering signal is a SIP SUBSCRIBE request for an event package the entity with credential supports and the first request is a SIP NOTIFY request. In some embodiments, the request triggering signal is a SIP NOTIFY request, e.g., communicating that a subscription to a presence server event packaged has been terminated, and the first request is SIP SUBSCRIBE request requesting to subscribe to the presence sever event package. In some embodiments, the request triggering signal is a SIP REFER request and the first request is one of a SIP NOTIFY request or a SIP INVITE request. Operation proceeds from step 814 to step 816.

In step 816 the SBC generates a challenge to the first request using the challenge received from the authenticating entity. Operation proceeds from step 816 to step 818.

In step 818 the SBC sends to the entity with credentials the generated challenge in response to the first request. Operation proceeds from step 818 to step 820.

In step 820 the SBC receives, from the entity with credentials, a second request in response to the generated challenge, said second request included a response to the generated challenge. In various embodiments, the autonomous request, first request, second request, and the request triggering signal are SIP request signals. In some embodiments, the second request is the first request updated to include a response to the generated challenge, e.g., updated to include an authorization header communicating credentials. In some such embodiments, the response included in the second request includes authentication credentials for the entity with authentication credentials. In some such embodiments, the authentication credentials are an authorization header. Operation proceeds from step 820 to step 822.

In step 822 the SBC updates the autonomous request using the response to the generated challenge received from the entity with authentication credentials. In various embodiments, updating the autonomous request includes including, e.g. adding, the received authorization header into the autonomous request. In various embodiments, updating the autonomous request includes including, e.g. replacing, an authorization header into the previously communicated autonomous request which was challenged, with the newly received authorization header from the entity with authentication credentials which was received in step 820. Operation proceeds from step 822 to step 824.

In step 824, the SBC sends the updated autonomous request to the authenticating entity.

Figure 9:
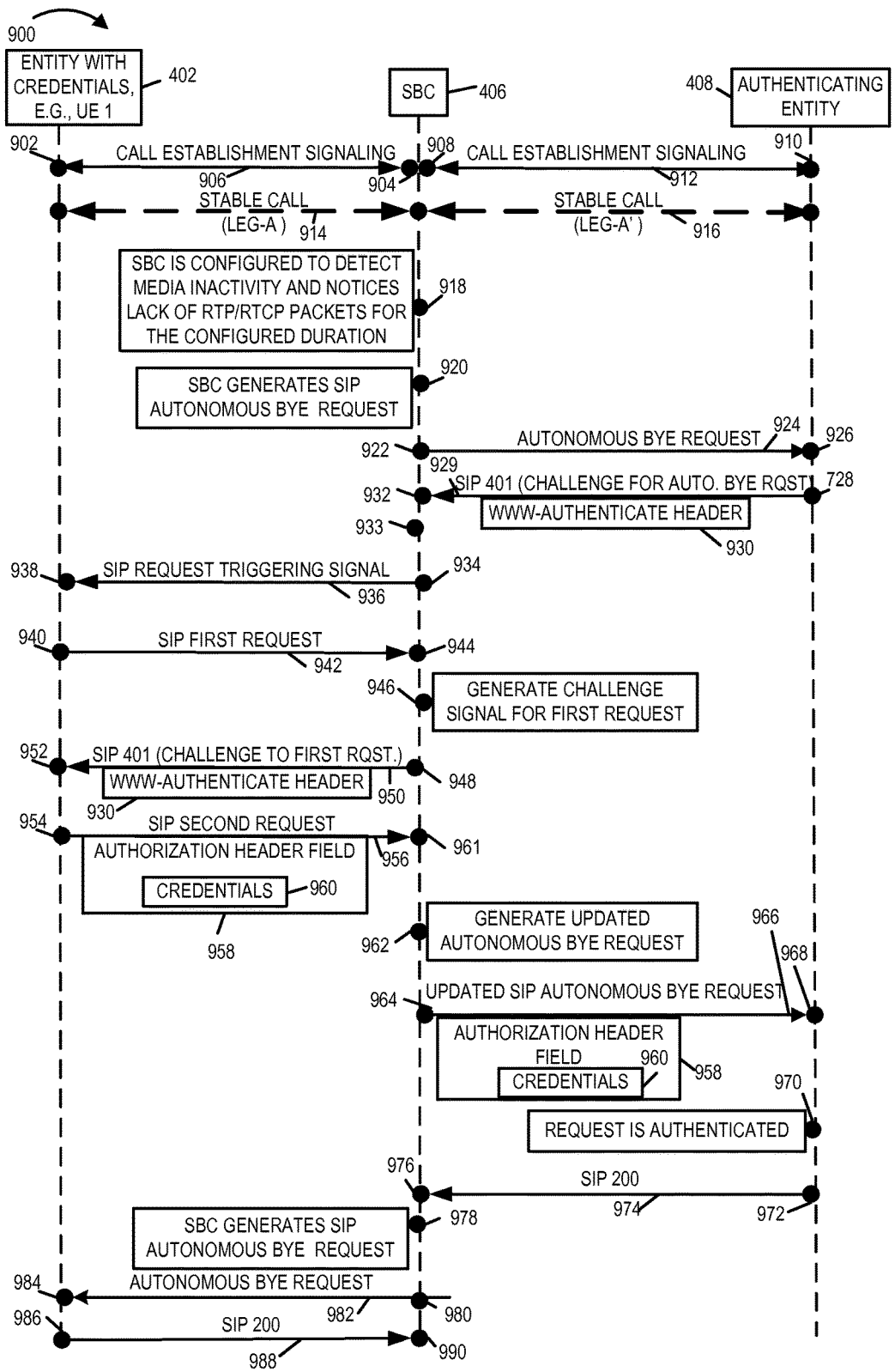
FIG. 9 illustrates exemplary steps and associated signaling exchanges between various devices, including an entity with authorization credentials, a session border controller and an authenticating entity, for supporting authentication for an autonomous request from an SBC in accordance with yet another exemplary embodiment.

FIG. 9 is a drawing 900 illustrates exemplary devices (an exemplary entity with authentication credentials, e.g., UE 1 402, exemplary session border controller (SBC) 406, exemplary authenticating entity 408, e.g., a SIP Registrar/Application Server) and exemplary signal flows in accordance with an exemplary method in accordance with some embodiments of the present invention.

In steps 902 and 904, the entity with authentication credentials 402 and the SBC 406, are operated, respectively, to send and receive call establishment signals 906. In steps 908 and 910, the SBC 406 and the authenticating entity 408 are operated, respectively, to send and receive call establishment signals 912. This results in a stable call being established. The stable call includes: stable call (Leg-A) 914 between the entity with authentication credentials 402 and the SBC 406 and stable call (Leg-A') 916 between the SBC 406 and the authenticating entity 408. Thus, via steps 904 and 908, the SBC 406 is operated to couple the entity with credentials 402 to the authenticating entity 408 through the SBC 406, and is operated to establish a communications session between the entity with authentication credentials 402 and the authenticating entity.

In step 918 the SBC 406, which is configured to detect media inactivity, notices a lack of RTP/RTCP packets for the configured duration, e.g., below a predetermined threshold. As a result of the detection of step 918, the SBC 406 generates a SIP autonomous BYE request 924 in step 920. In step 922 the SBC 406 sends the generated SIP autonomous BYE request 924 to the authenticating entity 408. In step 926 the authenticating entity 408 receives the autonomous BYE request 924. In step 928 the authenticating entity 404, generates and sends a SIP 401 message 929, which is a challenge message in response to the received autonomous BYE request message. The SIP 401 message 929 includes WWW-Authenticate header 930, which includes a challenge in response to the autonomous request 924. In step 932 the SBC 406 receives the SIP 401 message 932 including the challenge in response the autonomous BYE request 924. In step 933 the SBC 406 stores the received WWW-Authenticate header 930.

In step 934, the SBC 406 generates and sends a SIP request triggering signal 936 to the entity with authentication credentials 402, said request triggering signal triggering an entity receiving the signal to generate and send a request to the SBC 406. In some embodiments, the SIP request triggering signal 936 is one of a SIP REFER request, a SIP NOTIFY request, or a SIP SUBSCRIBE request. In step 938 the entity with credentials 402 receives the SIP request triggering signal 936.

In step 940, in response to the received request triggering signal 936 the entity with credentials 402 is triggered to generate and send a first SIP request 942 to the SBC 406. In some embodiments, the SIP request triggering signal 936 is a SIP SUBSCRIBE request for an event package, that the entity with credentials 402 supports, and the first SIP request 942 is a SIP NOTIFY request. In step 944, the SBC receives the SIP first request 942 from the entity with authentication credentials 402. In step 946 the SBC 406 generates a challenge signal 952 to the first request using the challenge received from the authenticating entity 408. In step 948 the SBC 406 sends generated SIP 401 message 950, which is a challenge signal corresponding to the first request. SIP 401 signal 950 includes WWW-Authenticate header 930, which is the challenge previously received from the authenticating entity 408 in signal 929.

In step 952 the entity with authentication credentials 402 receives the SIP 401 signal 950, which is a challenge signal corresponding to the first request signal 942.

In step 954 the entity with authentication credentials 402 generates and sends a SIP second request 956 to the SBC 406. In some embodiments, the second SIP second request 956 is the first SIP request 942 updated to include a response to the generated challenge. The SIP second request 956 includes an authorization header field 958 including authorization credentials 960 for the entity with authentication credentials 402. In some embodiments, the authentication credentials are the authentication header. The SIP second request 956 is a response to the SIP 401 message signal 750 communicating the challenge.

In step 961 the SBC 406 receives the SIP second request 956 from the entity with authentication credentials 402, the SIP second request 956 being in response to the generated challenge of step 946, said SIP second request 956 including a response to the generated challenge, the response being authorization header field 958 including credentials 960.

In step 962, the SBC 406 generates an updated autonomous BYE request using the response to the generated challenge received from the entity with authentication credentials 402. In step 964 the SBC 406 sends the updated autonomous BYE request 966 to the authenticating entity 408. The updated SIP autonomous BYE request 966 includes authorization header field 958 including authorization credentials 960.

In step 968 the authenticating entity 408 receives the updated SIP autonomous BYE request 966. In step 970 the authenticating entity 408 performs authenticating operations using the received authorization header 958 and determines that the updated autonomous request is authenticated. In step 972 the authenticating entity 408 generates and sends a SIP 200 message 974 to the SBC 406, which is received by the SBC in step 976.

In step 978 the SBC 406 generates a SIP autonomous BYE request. In step 980 the SBC 406 sends the generated SIP autonomous BYE request 982 to the entity with authentication credentials 402. In step 984 the entity with credentials 402 receives the autonomous BYE request and in step 986, the SBC 406 generates and sends a SIP 200 message 988 to the SBC, which is received by the SBC 406 in step 990. Thus, the SBC 406 generates and sends autonomous BYE requests to clean up both call legs (LEG-A, Leg-A') in response to detected media inactivity over the call legs.

Figure 10:
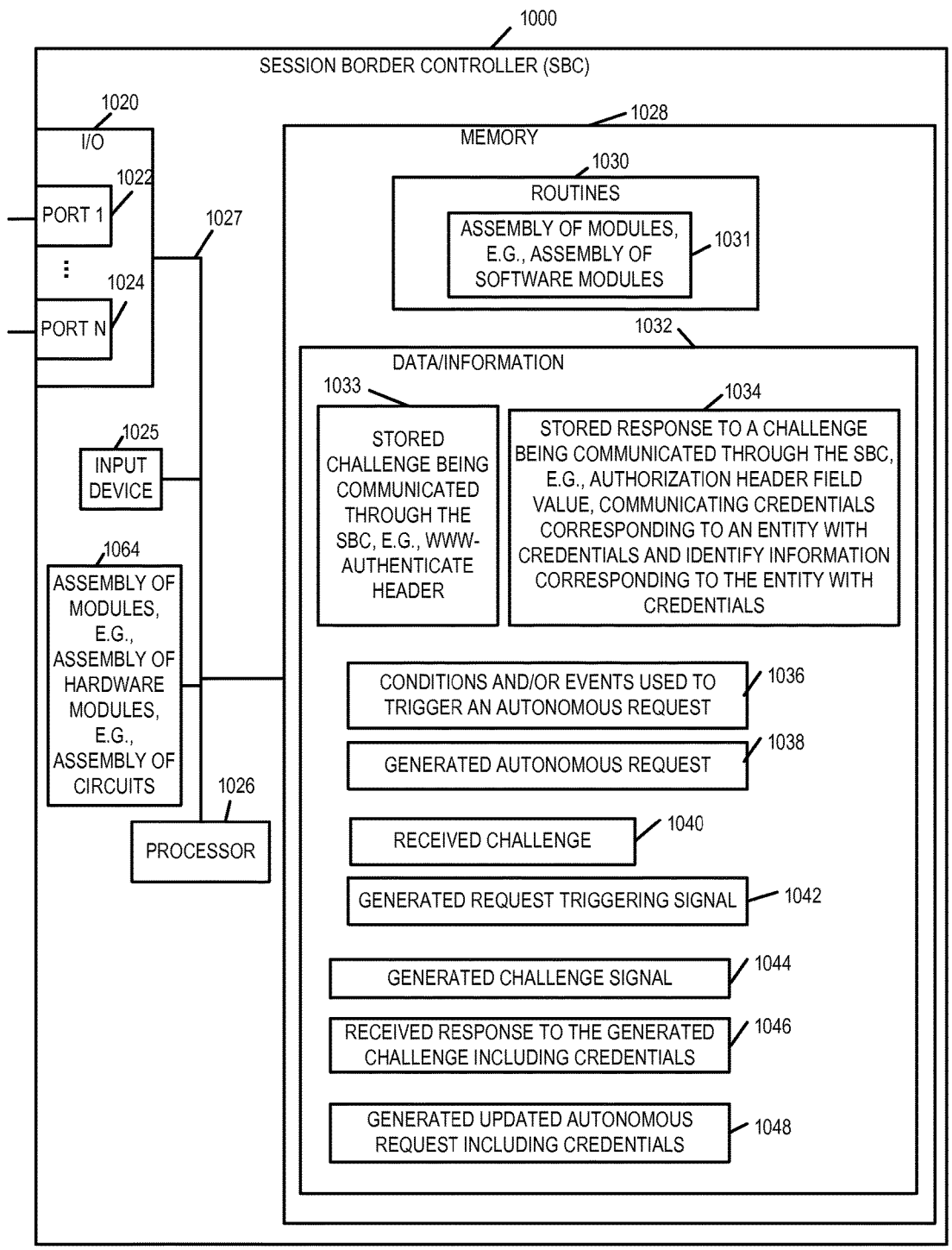
FIG. 10 illustrates an exemplary session border controller (SBC) that implements methods of the present invention and can be used as the session border controller shown in FIG. 4 or shown or described with respect to any of the FIGS. 4-13.

FIG. 10 illustrates an exemplary session border controller (SBC) 1000 that implements the methods of the present invention and can be used as the session border controller 406 shown in FIG. 4 or shown or described with respect to any of the FIGS. 4-13.

The SBC 1000 includes an input/output interface 1020 including a plurality of ports (Port 1 1022, . . . , Port N 1024) via which the SBC 1000 communicates with user devices (402, 403, . . . , 404), authenticating entity 408, e.g., a SIP REGISTRAR/Application Server, and/or other devices in the network 400. The SBC 1000 further includes an input device 1025, a processor 1026, e.g., a CPU, an assembly of hardware modules 1064 and memory 1028. The various components of the SBC 1000 are coupled together via bus 1027 which allows for data to be communicated between the components of the SBC 1000. The processor 1026 controls the SBC 1000 to operate in accordance with the invention and implement one or more of the methods of the present application, e.g., methods in accordance with one or more or all of FIGS. 5-9. One or more parameters and/or commands can be input/changed via the input device 1025 and/or select operations to be performed.

In some embodiments, I/O interface 1020 is configured to send a generated autonomous request, which has been generated by the SBC, to an authenticating entity. In some such embodiments, said I/O interface 1020 is further configured to: receive, by the SBC, from the authenticating entity in response to the autonomous request, a second challenge; send, by the SBC, a first request to the entity with authentication credentials, said first request being a request that will trigger an entity receiving the request to generate and send a request to the SBC; receive, by the SBC, a second request from said entity with authentication credentials in response to the first request sent by the SBC; send, from the SBC to the entity with authentication credentials, the generated challenge; receive, by the SBC, from the entity with credentials, a third request in response to the generated challenge, said third request including a response to the generated challenge; and send, by the SBC, the updated autonomous request to the authenticating entity.

In some embodiments, I/O interface 1020 is configured to: send an autonomous request, generated by the session border controller, to the authenticating entity; receive a challenge from the authenticating entity in response to the autonomous request; send, by the SBC, a request triggering signal to the entity with authentication credentials, said request triggering signal triggering an entity receiving the signal to generate and send a request to the SBC; receive, by the SBC, a first request from said entity with authentication credentials in response to the request triggering signal sent by the SBC; send, from the SBC to the entity with credentials, the generated challenge in response to the first request; receive, by the SBC, from the entity with credentials, a second request in response to the generated challenge, said second request including a response to the generated challenge; and send, by the SBC, an updated autonomous request to the authenticating entity.

The memory 1028 includes routine 1030 including an assembly of modules 1031, e.g., an assembly of software modules, and data/information 1032. The processor 1026 executes various routines 1030 including modules in assembly of modules 1031 and uses data/information 1032 to control the SBC 1000 to operate in accordance with the invention.

Data/information 1032 includes a stored challenge being communicated through the SBC, e.g., a WWW-Authenticate header 1033, a stored response 1034 to a challenge being communicated through the SBC 1000, e.g., an authorization header field value, communicating credentials corresponding to an entity with authorization credentials, e.g. UE 1 402, and identity information corresponding to the entity with credentials. In some embodiments, the stored response information, e.g., a stored authorization header field value, corresponding to a challenge is used in an autonomous request generated by the SBC 1000 and sent to an authenticating entity. Data/information 1032 further includes conditions and/or events used to trigger an autonomous request 1036. Exemplary conditions which may be detected to trigger a autonomous request include, e.g., detection of a fax tone, e.g., during a stable call in which the stream uses G.711, and detection of media inactivity on a stable call, e.g., detection of lack of RTC/RTCP packets for the configured duration.

Data/information 1032 further includes a generated autonomous request 1038, e.g., intended to be sent to an authenticating entity. In some embodiments, the generated autonomous request 1038 does not include an authorization header field. For example generated autonomous request 1038 is one of SIP autonomous request 724 of FIG. 7, SIP autonomous request 1424 of FIG. 7A, SIP autonomous request 1524 of FIG. 7B, SIP autonomous request 1624 of FIG. 7C or SIP autonomous BYE request 924 of FIG. 9. In some embodiments, the generated autonomous request 1038 includes an authorization header field from a previously stored response from an entity with authorization credentials which has previously sent the response through the SBC. For example, the generated autonomous request 1038 is SIP autonomous request 598 of FIG. 5A.

Data/information 1032 further includes a received challenge 1040 from an authenticating entity, e.g., a SIP 401 message including a WWW-Authenticate HEADER. For example the received challenge message signal 1040 is, e.g., one of SIP 401 message 583 including WWW-Authenticate header 1 583, SIP 401 message 729 including WWW-Authenticate header 730, SIP 401 message 1429 including WWW-Authenticate header 1430, SIP 401 message 1529 including WWW-Authenticate header 1530, SIP 401 message 1629 including WWW-Authenticate header 1630 or SIP 401 message 929 including WWW-Authenticate header 930. Data/information 1032 further includes a generated request triggering signal 1042, e.g., one of a SIP REFER request, a SIP NOTIFY request, or a SIP SUBSCRIBE request. Generated request triggering signal 1042 is, e.g., one of first SIP request 573 of FIG. 5B, SIP request triggering signal 736 of FIG. 7, SIP REFER request signal 1436 of FIG. 7A, SIP NOTIFY request signal 1536 of FIG. 7B, SIP SUBSCRIBE request signal 1636 of FIG. 7C or SIP request triggering signal 936 of FIG. 9. Data/information 1032 further includes a generated challenge signal 1044 to be sent to an entity with credentials, said generated challenge signal including a challenge received from the authenticating entity. Generated challenge signal 1044 is, e.g., one of SIP 401 message signal 559 of FIG. 5B, SIP 401 message signal 750 of FIG. 7, SIP 401 message signal 1450 of FIG. 7A, SIP 401 message signal 1550 of FIG. 7B, SIP 401 message signal 1650 of FIG. 7C or SIP 401 message signal 950 of FIG. 9.

Data/information 1032 further includes a received response to the generated challenge 1046, said received response including credentials, e.g., an authorization header field value. Received response 1046 is, e.g., one of third SIP request 547 of FIG. 5B, SIP second request 756 of FIG. 7, SIP NOTIFY request 1456 of FIG. 7A, SIP SUBSCRIBE request 1556 of FIG. 7B, SIP NOTIFY request 1656 of FIG. 7C or SIP second request 956 of FIG. 9. Data/information 1032 further includes a generated updated autonomous request including credentials 1048. Generated updated autonomous request including credentials 1048 is, e.g., one of updated autonomous request 541 of FIG. 5B, updated SIP autonomous request 766 of FIG. 7, updated SIP autonomous request 1466 of FIG. 7A, updated SIP autonomous request 1566 of FIG. 7B, updated SIP autonomous request 1666 of FIG. 7C or updated SIP autonomous BYE request 966 of FIG. 9.

In some embodiments some or all of the routines and/or modules of the present invention are implemented in hardware, e.g., as application-specific integrated circuits (ASICs) or other circuits. In such embodiments the modules are implemented in a circuit or circuits. Thus in at least some embodiments the implementation is made fully in hardware. The assembly of modules 1064, in some embodiments includes each modules implemented in hardware. In some embodiments the SBC 1000 includes assembly of modules 1068 while in some other embodiments the SBC 1000 includes assembly of modules 1064. Still in some other embodiments both the assembly of modules 1060 and assembly of modules 1064 are included in the SBC 1000.

In some embodiments the I/O interface 1020 is configured to implement the receiving and sending steps performed by the SBC 1000 while the processor 1026 is configured to perform other steps such as the monitoring, decision making and controlling steps performed by the SBC.

In various embodiments a device of any of one or more of FIGS. 4-10, e.g., session border controller or other device, includes a module corresponding to each of the individual steps and/or operations described with regard to any of the FIGS. 4-13 in the present application and/or described in the detailed description of the present application. The modules may, and sometimes are implemented in hardware. In other embodiments, the modules may, and sometimes are, implemented as software modules including processor executable instructions which when executed by the processor of the device cause the device to implement the corresponding step or operation. In still other embodiments, some or all of the modules are implemented as a combination of hardware and software.

Figure 11:
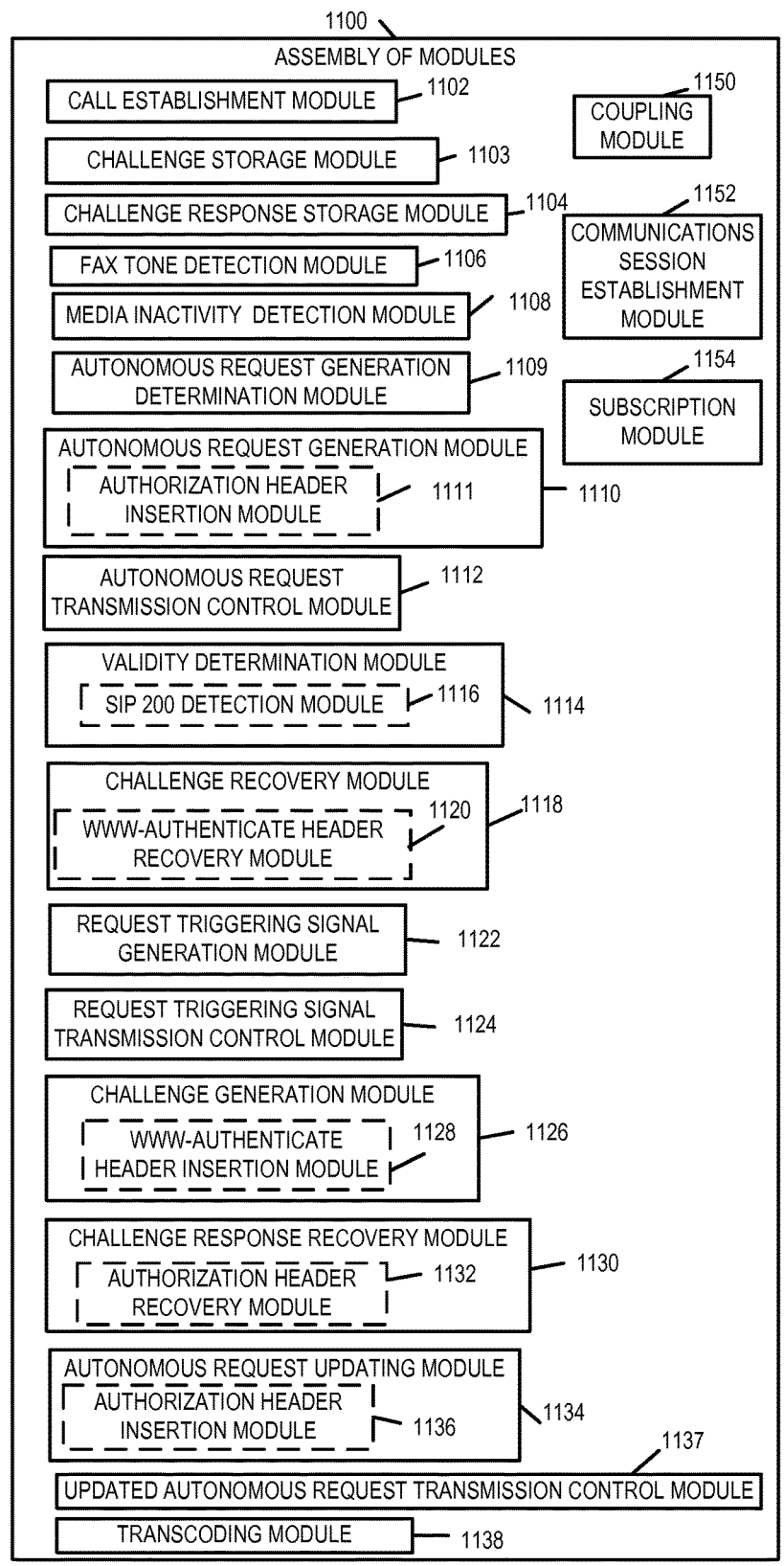
FIG. 11 illustrates an exemplary assembly of modules that can be used in the session border controller of FIGS. 4-10.

FIG. 11 is a drawing of an assembly of modules 1100, which may be included in an exemplary session border (SBC), e.g., SBC 1000 of FIG. 10 and/or session border controller (SBC) 406 of FIGS. 4-9, in accordance with an exemplary embodiment. Assembly of modules 1100 can, and in some embodiments is, used in the SBC 1000 and/or SBC 406. The modules in the assembly of modules 1100 can, and in some embodiments are, implemented fully in hardware within the processor 1026, e.g., as individual circuits. The modules in the assembly of modules 1100 can, and in some embodiments are, implemented fully in hardware within the assembly of modules 1064, e.g., as individual circuits corresponding to the different modules. In other embodiments some of the modules are implemented, e.g., as circuits, within the processor 1026 with other modules being implemented, e.g., as circuits within assembly of modules 1064, external to and coupled to the processor 1026. As should be appreciated the level of integration of modules in the processor and/or with some modules being external to the processor may be one of design choice.

Alternatively, rather than being implemented as circuits, all or some of the modules may be implemented in software and stored in the memory 1028 of the SBC 1000, with the modules controlling operation of SBC 1000 to implement the functions corresponding to the modules when the modules are executed by a processor, e.g., processor 1026. In some such embodiments, the assembly of modules 1100 is included in the memory 1028 as assembly of modules 1031. In still other embodiments, various modules in assembly of modules 1100 are implemented as a combination of hardware and software, e.g., with another circuit external to the processor providing input to the processor 1026 which then under software control operates to perform a portion of a module's function. While shown in the FIG. 10 embodiment as a single processor, e.g., computer, it should be appreciated that the processor 1026 may be implemented as one or more processors, e.g., computers.

When implemented in software the modules include code, which when executed by the processor 1026, configure the processor 1026 to implement the function corresponding to the module. In embodiments where the assembly of modules 1100 is stored in the memory 1028, the memory 1028 is a computer program product comprising a computer readable medium comprising code, e.g., individual code for each module, for causing at least one computer, e.g., processor 1026, to implement the functions to which the modules correspond.

Completely hardware based or completely software based modules may be used. However, it should be appreciated that any combination of software and hardware, e.g., circuit implemented modules may be used to implement the functions. As should be appreciated, the modules illustrated in FIG. 11 control and/or configure the SBC 1000 or elements therein such as the processor 1026, to perform the functions of corresponding steps illustrated in the method of one or more of the signaling drawings of FIG. 5, 7, 7A, 7B, 7C, 9 and/or one or more of the flowcharts of FIGS. 6, and 8 and/or described with respect to any of the FIGS. 4-13. Thus the assembly of modules 1100 includes various modules that perform functions of corresponding steps of one or more of FIGS. 5, 6, 7, 7A, 7B, 7C, 8, and/or 9.

FIG. 11 is a drawing of an assembly of modules 1100 in accordance with some embodiments. Assembly of modules 1100 includes a call establishment module 1102, a challenge storage module 1103, a challenge response storage module 1104, a fax tone detection module 1106, a media inactivity detection module 1108, a autonomous request generation determination module 1109, an autonomous request generation module 1110, an autonomous request transmission control module 1112, a validity determination module 1114, and a challenge recovery module 1118.

Call establishment module 1102 is configured to establish a call, e.g., a call including a first leg between the SBC and an entity with credentials and a second leg between the SBC and an authenticating entity. Challenge storage module 1103 is configured to store a challenge, e.g., a first challenge, being communication through the SBC, e.g., a first challenge from an authenticating entity to an entity with authentication credentials. Challenge response storage module 1104 is configured to store, by the session border controller, a response from an entity with authentication credentials to a first challenge from an authenticating entity, said response being communicated through the session border controller. In some embodiments, the response is an authentication response. In some embodiments, the response is included in a SIP request message sent from the entity with authentication credentials. In some such embodiments, the SIP request message including the response is a SIP INVITE message. In some embodiments, the SIP request message is transmitted from the entity with authentication credentials through the SBC as part of the establishment of a SIP dialog, SIP session, SIP registration, or Voice Over Internet Protocol call session.

Fax tone detection module 1106 is configured to detect, by the SBC, a fax tone on a communications session established between an entity with authentication credentials and an authenticating entity through the SBC. In some embodiments, an autonomous request may be, and sometimes is generated by the SBC in response to a detected fax tone detected by fax tone detection module 1106.

Media inactivity detection module 1108 is configured to detect media inactivity, e.g., a lack of RTP/RTCP packets for a configured duration on stable call legs. In some embodiments, an autonomous BYE request may be, and sometimes is, generated by the SBC in response to a detected media inactivity, e.g., below a predetermined threshold level, on one or more calls legs corresponding to a call.

Autonomous request generation determination module 1109 is configured to make a determination whether or not to generate an autonomous request, e.g., based on a SBC detected autonomous request triggering event or SBC detected autonomous request triggering condition.

Autonomous request generation module 1110 is configured to generate, by the SBC, an autonomous request using a stored response, e.g., the stored response stored by challenge response storage module 1104. In some embodiments using the stored response includes including at least a portion of the stored response in the autonomous request. In some such embodiments, the stored response includes authentication credentials for the entity with authentication credentials. In some embodiments, the stored response is an authorization header. In some embodiments, autonomous request generation module 1110 includes an authorization header insertion module 1111 configured to add an authorization header included in the stored response. Autonomous request transmission control module 1112 is configured to control the I/O interface to send a SBC generated autonomous request to an authenticating entity.

Validity determination module 1114 is configured to determine, by the SBC, that the response has been accepted as valid by the authenticating entity prior to said autonomous request generation module 1110 using the stored response to generate the autonomous request. In some embodiments, validity determination module 1114 includes a SIP 200 detection module 1116 configured to determine that the authentication entity has responded to the SIP request with a SIP 200 response message communicated through the SBC.

Challenge recovery module 1118 is configured to recover a second challenge from a second challenge signal, e.g., a SIP 401 message, sent from authenticating entity in response to the autonomous request. In some embodiments, challenge recovery module 1118 includes a WWW-Authenticate header recovery module 1120 configured to recover a WWW-Authenticate header communicated in the received SIP 401 message.

Assembly of module 1100 further includes a request triggering signal generation module 1122, a request triggering signal transmission control module 1124, a challenge generation module 1126, a challenge response recovery module 1130, an autonomous request updating module 1134, an updated autonomous request transmission control module 1137 and a transcoding module 1138.

Request triggering signal generation module 1122 is configured to generate a request to the entity with authentication credentials, said request being a request that will trigger an entity receiving the request to generate and send a request to the SBC. In some embodiments, request triggering signal generation module 1122 is configured to generate a first request to the entity with authentication credentials, said first request being a request that will trigger an entity receiving the request to generate and send a request to the SBC.

In some embodiments, the generated request triggering signal is a SIP signal. In some embodiments, the generated request triggering signal, is one of a SIP REFER request, a SIP NOTIFY request or a SIP SUBSCRIBE request. In some embodiments, the request triggering signal is a SIP SUBSCRIBE request for an event package the entity with authentication credentials supports.

Request triggering signal transmission control module 1124 is configured to control the I/O interface, e.g., I/O interface 1020, to send the generated request triggering signal to the entity with authentication credentials.

Challenge generation module 1126, in some embodiments, e.g., the embodiments of FIG. 5 or FIG. 6, is configured to generate, by the SBC, a challenge to the second request using the second challenge. Challenge generation module 1126, in some embodiments, e.g., the embodiments, of FIG. 7, 7A, 7B, 7C, 8 or 9, is configured to generate, by the SBC, the challenge to the first request using the challenge received from the authenticating entity. In some embodiments, challenge generation module 1126 includes a www-Authenticate header insertion module 1128 configured to include in the SBC generated challenge message, e.g., a SIP 401 message, the WWW-Authenticate header received in the challenge from the authenticating entity.

Challenge response recovery module 1130 is configured to recover a challenge response from a received signal received by the I/O interface, said received challenge response being in response to the generated challenge. In some embodiments, e.g., the embodiments of FIG. 5 or FIG. 6, the received signal including the challenge response is a third request in response to the generated challenge. In some other embodiments, e.g., the embodiments, of FIG. 7, 7A, 7B, 7C, 8 or 9, the received signal including the challenge response is a second request in response to the generated challenge.

In some embodiments, challenge response recovery module 1130 includes an authorization header recovery module 1132 configured to recover an authorization header field communicating authentication credentials.

Autonomous request updating module 1134 is configured to update, by the SBC, the autonomous request using the response to the generated challenge received from the entity with authentication credentials.

In some embodiments, autonomous request updating module 1134 includes an authorization header insertion module 1136 configured to include the authorization header field recovered by the challenge response recovery module 1130 in the updated autonomous request. Updated autonomous request transmission control module 1137 is configured to control the I/O interface, e.g., I/O interface 1020, to send the updated autonomous request generated by module 1134 to the entity with authenticating entity.

Transcoding module 1138 is configured to between different protocols, e.g., transcode between G.711 standard and T.38 standard to support a call leg that does not support T.38.

Assembly of modules 1100 further includes a coupling module 1150, a communications session establishment module 1152 and a subscription module 1154. Coupling module 1150 is configured to couple an entity with authentication credentials to an authenticating entity through the SBC. Communications session establishment module 1152 is configured to establish a communications session between an entity with authentication credentials and an authenticating entity prior to sending an autonomous request, generated by the session border controller, to the authenticating entity. Subscription module 1154 is configured to perform operation pertaining to subscriptions, e.g., determining that an entity with authentication credentials has a current active subscription to a presence server event package, determining that the SBC may subscribe to the entity with credentials for an event package, etc., generating signals related to the subscription, e.g., a NOTIFY or a SUBSCRIBE, etc.

In some embodiments, the triggering event for the SBC generated autonomous request is a detected fax tone by fax tone detection module 1106. In some such embodiments the autonomous request is part of re-negotiation with the authenticating entity to use a T.38 fax relay standard for a fax transmission. In some such embodiments, the autonomous request is a SIP reINVITE including a SDP parameter indicating the T.38 fax relay standard.

In some embodiments, e.g., some embodiments corresponding to FIG. 5 and/or FIG. 6, the autonomous, first, second and third requests are SIP signals. In some such embodiments, the third request is an updated version of the second request including a response to the generated challenge.

In some embodiments, e.g., some embodiments corresponding to FIG. 7, FIG. 7A, FIG. 7B, FIG. 7C, FIG. 8, and/or FIG. 9, the autonomous request, first request, second request, and the request triggering signal are SIP request signals. In some embodiments, e.g., some embodiments corresponding to FIG. 7, FIG. 7A, FIG. 7B, FIG. 7C, FIG. 8, and/or FIG. 9, the request triggering signal is one of a SIP REFER request, a SIP NOTIFY request or a SIP SUBSCRIBE request. In some embodiments, e.g., some embodiments corresponding to FIG. 7, FIG. 7A, FIG. 7B, FIG. 7C, FIG. 8, and/or FIG. 9, the request triggering signal is a SIP SUBSCRIBE request for an event package the entity with credentials supports and the first request is a SIP NOTIFY request. In some embodiments, e.g., some embodiments corresponding to FIG. 7, FIG. 7A, FIG. 7B, FIG. 7C, FIG. 8, and/or FIG. 9, the second request is the first request updated to include a response to the generated challenge. In some such embodiments, the response included in the second request includes authentication credentials for the entity with authentication credentials. In some such embodiments, the authentication credentials are an authorization header.

Figure 12:
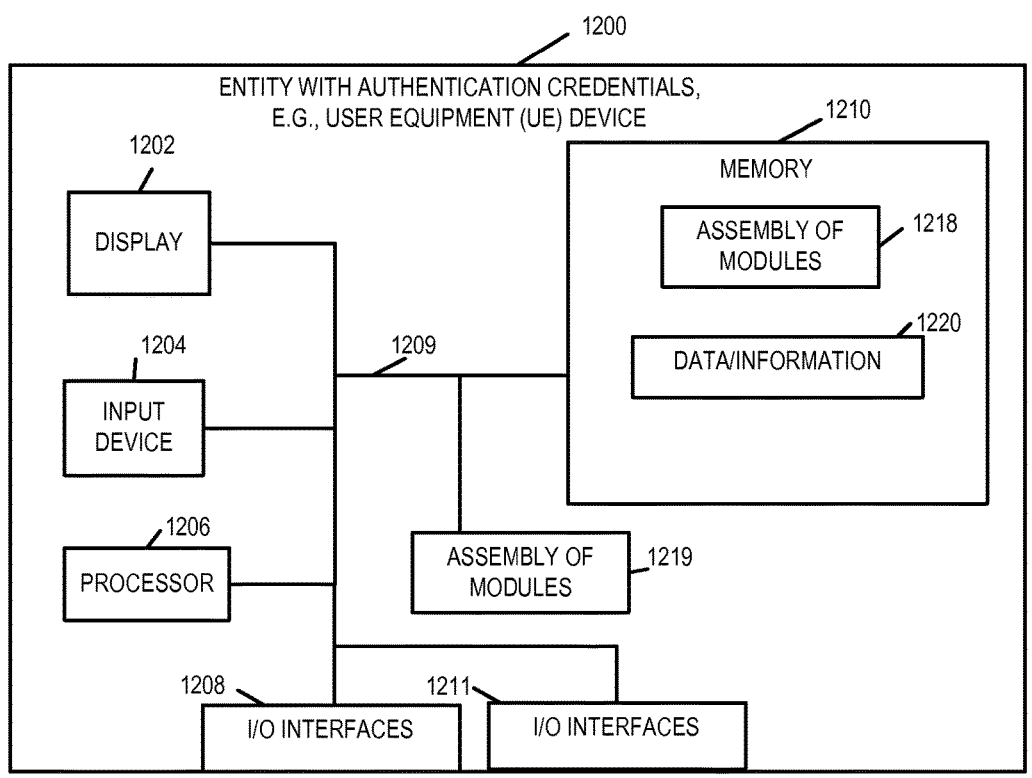
FIG. 12 illustrates an exemplary embodiment of an exemplary entity with authentication credentials, e.g., a user equipment (UE) device, in accordance with various embodiments of the present invention.

FIG. 12 illustrates an exemplary entity with authentication credentials 1200, e.g., a user equipment (UE) device, in accordance with various exemplary embodiments of the present invention. The exemplary entity with authentication credentials 1200 can be used as UE device 402 or any one of the UE devices shown in FIG. 4. The entity with authentication credentials 1200 performs various operations including, e.g., establishing a call, sending an INVITE, receiving and processing a request triggering signal, sending various requests, e.g., sending a NOTIFY request, sending a SUBSCRIBE request, receiving a challenge, generating and sending a response to a challenge, said response including authorization credentials, etc.

Exemplary entity with credentials 1200, e.g. a UE device, includes a display 1202, an input device 1204 such as a keypad, a processor 1206, e.g., a CPU, I/O interfaces 1208 and 1211, memory 1210, and an assembly of modules 1218, e.g., circuits corresponding to different modules, coupled together via a bus 1209 over which the various elements may interchange data and information. The I/O interfaces 1208 and 1211 include receivers and transmitters which couple the device 1200 to various devices such as the SBC and networks. Memory 1210 includes an assembly of modules 1218, e.g., an assembly of software modules, and data/information 1220. The assembly of modules 1219 and/or 1218 includes modules for communicating over Internet Protocol networks using Session Initiation Protocol (SIP) and Session Description Protocol (SDP). The exemplary device 1200 may, and in some embodiments is, implemented as a device such a Voice Over Internet Phone, a mobile phone, Smartphone, tablet, laptop computer or other communications device.

Figure 13:
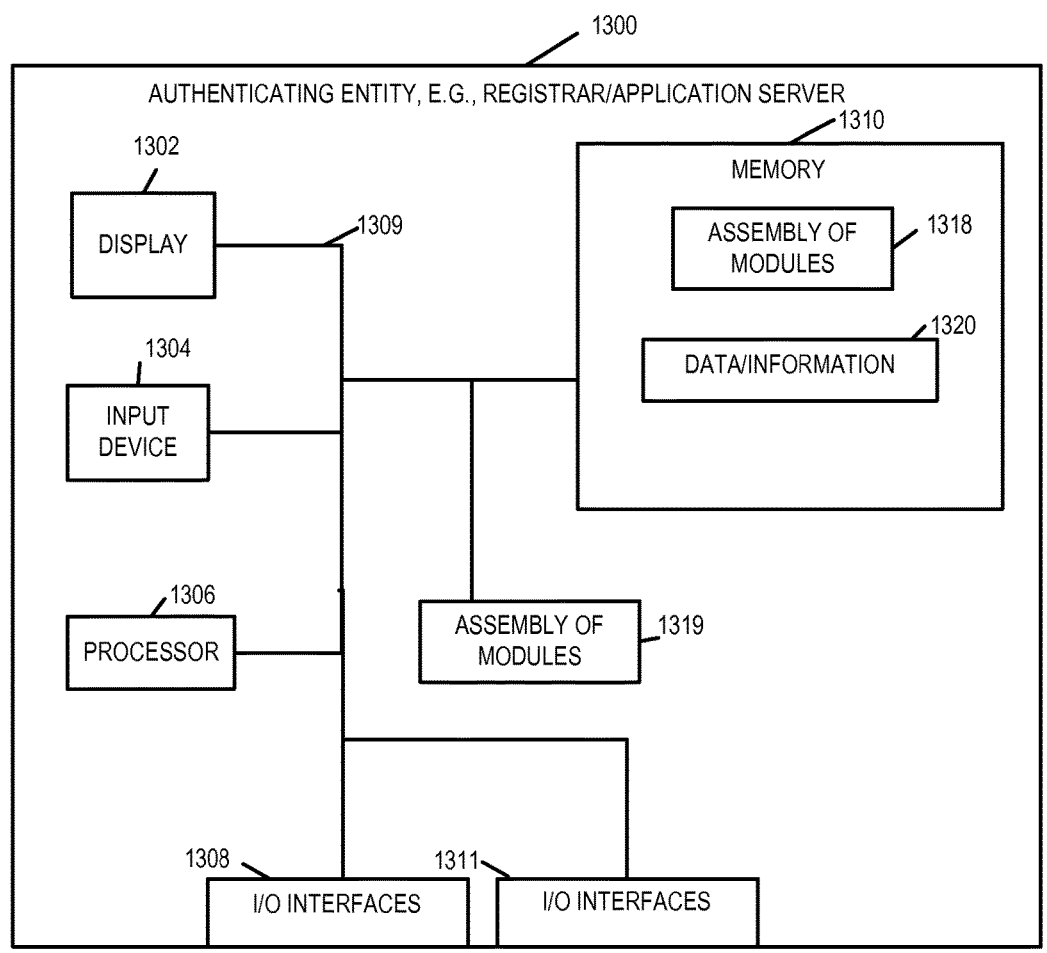
FIG. 13 illustrates an exemplary authenticating entity, e.g., a SIP registrar/application server, implemented in accordance with various embodiment of the present invention.

FIG. 13 illustrates an exemplary authenticating entity 1300, e.g., a Registrar/Application server, implemented in accordance with various embodiments, of the present invention. The exemplary authenticating entity 1300 can be used as the SIP registrar/Application Server 408 of FIG. 4. The authenticating entity 1300 performs various operations including, e.g., receiving requests including autonomous requests from an SBC, authenticating received requests, generating and sending challenges to received requests that fail authentication, receiving updated autonomous request including a response to a challenge, processing a received updated autonomous request including valid authentication credentials, generating and sending a SIP 200 message, etc.

The authentication entity 1300 includes a display 1302, an input device 1304 such as a keypad, a processor 1306, e.g., a CPU, I/O interfaces 1308 and 1311, memory 1310, and an assembly of modules 1319, e.g., circuits corresponding to different modules, coupled together via a bus 1309 over which the various elements may interchange data and information. The I/O interfaces 1308 and 1311 include receivers and transmitters which couple the authentication entity 1300 to one or more devices such as the SBC. The authentication entity 1300 can send and receive information via the I/O interfaces. Memory 1310 includes an assembly of modules 1318, e.g., an assembly of software modules, and data/information 1320. The assembly of modules 1319 and/or 1318 includes modules for communicating over Internet Protocol networks using Session Initiation Protocol (SIP) and Session Description Protocol (SDP).

In some embodiments an exemplary session border controller includes a non-transitory computer readable medium including processor executable instructions, the non-transitory computer readable medium comprising: instructions which when executed by at least one processor control said session border controller to: store, by the session border controller, a response from an entity with authentication credentials to a first challenge from an authenticating entity, said response being communicated through the session border controller; generate, by the session border controller, an autonomous request using the stored the response; and to control an interface of the session border controller to send the autonomous request to the authenticating entity.

In some embodiments, an exemplary session border controller comprises: a processor configured to: store, by the session border controller, a response from an entity with authentication credentials to a first challenge from an authenticating entity, said response being communicated through the session border controller; generate, by the session border controller, an autonomous request using the stored the response; and send the autonomous request to the authenticating entity.

In some embodiments an exemplary session border controller includes a non-transitory computer readable medium including processor executable instructions, the non-transitory computer readable medium comprising: instructions which when executed by at least one processor control said session border controller to: couple an entity with authentication credentials to an authenticating entity through the SBC; send an autonomous request, generated by the session border controller, to the authenticating entity; receive a challenge from the authenticating entity in response to the autonomous request; send, by the SBC, a request triggering signal to the entity with authentication credentials, said request triggering signal triggering an entity receiving the signal to generate and send a request to the SBC; receive, by the SBC, a first request from said entity with authentication credentials in response to the request triggering signal sent by the SBC; generate, by the SBC, a challenge to the first request using the challenge received from the authenticating entity; send, from the SBC to the entity with credentials, the generated challenge in response to the first request; receive, by the SBC, from the entity with credentials, a second request in response to the generated challenge, said second request including a response to the generated challenge; update, by the SBC, said autonomous request using the response to the generated challenge received from the entity with authentication credentials; and send, by the SBC, an updated autonomous request to the authenticating entity.

In some embodiments an exemplary session border controller includes a processor configured to control the session border controller to: couple an entity with authentication credentials to an authenticating entity through the SBC; send an autonomous request, generated by the session border controller, to the authenticating entity; receive a challenge from the authenticating entity in response to the autonomous request; send, by the SBC, a request triggering signal to the entity with authentication credentials, said request triggering signal triggering an entity receiving the signal to generate and send a request to the SBC; receive, by the SBC, a first request from said entity with authentication credentials in response to the request triggering signal sent by the SBC; generate, by the SBC, a challenge to the first request using the challenge received from the authenticating entity; send, from the SBC to the entity with credentials, the generated challenge in response to the first request; receive, by the SBC, from the entity with credentials, a second request in response to the generated challenge, said second request including a response to the generated challenge; update, by the SBC, said autonomous request using the response to the generated challenge received from the entity with authentication credentials; and send, by the SBC, an updated autonomous request to the authenticating entity.

An exemplary method of operating a session border controller, in accordance with some embodiments, comprises: storing, by the session border controller, a response from an entity with authentication credentials to a first challenge from an authenticating entity, said response being communicated through the session border controller; generating, by the session border controller, an autonomous request using the stored the response; and sending the autonomous request to the authenticating entity. In some such embodiments using the stored response includes including at least a portion of the stored response in the autonomous request. In various embodiments, the stored response includes authentication credentials for the entity with authentication credentials. In some embodiments, the stored response is an authorization header. In some embodiments, the response is an authentication response. In various embodiments, using the stored response includes adding the stored response to the autonomous request, said stored response being an authorization header.

In some embodiments, the response is included in a SIP request message sent from the entity with the authentication credentials. In some such embodiments, the SIP request message is transmitted from the entity with credentials to the authenticating entity through the SBC as part of the establishment of a SIP dialog, SIP session, SIP registration, or Voice Over Internet Protocol call session.

In some embodiments, the exemplary method further comprises: determining, by the SBC, that the response has been accepted as valid by the authenticating entity prior to using the stored response to generate the autonomous request. In some such embodiments determining, by the SBC, that the response has been accepted as valid by the authenticating entity includes determining by the SBC that the authenticating entity responds to the SIP request with a SIP 200 response message communicated through the SBC.

In some embodiments, the exemplary method includes detecting, by the SBC, a fax tone on a communication session established between the entity with authentication credentials and the authenticating entity through the SBC; said autonomous request being a part of a re-negotiation with the authenticating entity to use a T.38 fax relay standard for a fax transmission. In some embodiments, said autonomous request is a SIP reINVITE request including an SDP parameter indicating the T.38. fax relay standard.

In various embodiments, the exemplary method includes: receiving, by the SBC, from the authenticating entity in response to the autonomous request a second challenge; sending, by the SBC, a first request to the entity with authentication credentials, said first request being a request that will trigger an entity receiving the request to generate and send a request to the SBC; receiving, by the SBC, a second request from said entity with authentication credentials in response to the first request sent by the SBC; generating, by the SBC, a challenge to the second request using the second challenge; sending, from the SBC to the entity with authentication credentials, the generated challenge; receiving, by the SBC, from the entity with credentials, a third request in response to the generated challenge, said third request including a response to the generated challenge; updating, by the SBC, said autonomous request using the response to the generated challenge received from the entity with authentication credentials; and sending, by the SBC, the updated autonomous request to the authenticating entity. In some such embodiments, the autonomous, first, second and third requests are SIP signals. In various embodiments, the third request is an updated version of the second request including a response to the generated challenge.

An exemplary session border controller, in accordance with some embodiments, comprises: a challenge response storage module configured to store, by the session border controller, a response from an entity with authentication credentials to a first challenge from an authenticating entity, said response being communicated through the session border controller; an autonomous request generation module configured to generate, by the session border controller, an autonomous request using the stored the response; and an interface configured to send the autonomous request to the authenticating entity.

In some such embodiments using the stored response includes including at least a portion of the stored response in the autonomous request. In some such embodiments the stored response includes authentication credentials for the entity with authentication credentials. In some embodiments, the stored response is an authorization header. In some embodiments, the response is an authentication response.

In various embodiments, said autonomous request generation module includes an authorization header insertion module configured to add an authorization header included in the stored response.

In some embodiments, the response is included in a SIP request message sent from the entity with the authentication credentials. In some such embodiments, the SIP request message is transmitted from the entity with credentials to the authenticating entity through the SBC as part of the establishment of a SIP dialog, SIP session, SIP registration, or Voice Over Internet Protocol call session.

In some embodiments, the session border controller further comprises: a validity determination module configured to determine, by the SBC, that the response has been accepted as valid by the authenticating entity prior to said autonomous request generation module using the stored response to generate the autonomous request. In some such embodiments, said validity determination module includes: a SIP 200 detection module configured to determine that the authenticating entity has responded to the SIP request with a SIP 200 response message communicated through the SBC.

In various embodiments, the exemplary session border controller includes a fax tone detection module configured to detect, by the SBC, a fax tone on a communication session established between the entity with authentication credentials and the authenticating entity through the SBC; said autonomous request being a part of a re-negotiation with the authenticating entity to use a T.38 fax relay standard for a fax transmission. In some suche embodiments, said autonomous request is a SIP reINVITE request including an SDP parameter indicating the T.38. fax relay standard.

In various embodiments, said interface is further configured to: receive, by the SBC, from the authenticating entity in response to the autonomous request, a second challenge; send, by the SBC, a first request to the entity with authentication credentials, said first request being a request that will trigger an entity receiving the request to generate and send a request to the SBC; receive, by the SBC, a second request from said entity with authentication credentials in response to the first request sent by the SBC; send, from the SBC to the entity with authentication credentials, the generated challenge; receive, by the SBC, from the entity with credentials, a third request in response to the generated challenge, said third request including a response to the generated challenge; send, by the SBC, the updated autonomous request to the authenticating entity. In some embodiments, the session border controller further comprises: a challenge generation module configured to generate, by the SBC, a challenge to the second request using the second challenge; and an autonomous request updating module configured to update, by the SBC, said autonomous request using the response to the generated challenge received from the entity with authentication credentials.

In various embodiments, the autonomous, first, second and third requests are SIP signals. In some such embodiments, the third request is an updated version of the second request including a response to the generated challenge.

An exemplary method of operating a session border controller (SBC), in accordance with some embodiments, comprises: coupling an entity with authentication credentials to an authenticating entity through the SBC; sending an autonomous request, generated by the session border controller, to the authenticating entity; receiving a challenge from the authenticating entity in response to the autonomous request; sending, by the SBC, a request triggering signal to the entity with authentication credentials, said request triggering signal triggering an entity receiving the signal to generate and send a request to the SBC; receiving, by the SBC, a first request from said entity with authentication credentials in response to the request triggering signal sent by the SBC; generating, by the SBC, a challenge to the first request using the challenge received from the authenticating entity;

sending, from the SBC to the entity with credentials, the generated challenge in response to the first request; receiving, by the SBC, from the entity with credentials, a second request in response to the generated challenge, said second request including a response to the generated challenge; updating, by the SBC, said autonomous request using the response to the generated challenge received from the entity with authentication credentials; and sending, by the SBC, the updated autonomous request to the authenticating entity.

In some such embodiments, the exemplary method further comprises establishing a communication session between the entity with authentication credentials and the authenticating entity prior to sending the autonomous request, generated by the session border controller, to the authenticating entity. In some such embodiments, the autonomous request, first request, second request, and the request triggering signal are SIP request signals.

In various embodiments, the request triggering signal is one of a SIP REFER request, a SIP NOTIFY request or a SIP SUBSCRIBE request. In some embodiments, the request triggering signal is a SIP SUBSCRIBE request for an event package the entity with credentials supports and the first request is a SIP NOTIFY request.

In some embodiments, the second request is the first request updated to include a response to the generated challenge. In some such embodiments, the response included in the second request includes authentication credentials for the entity with authentication credentials. In some such embodiments, the authentication credentials are an authorization header.

An exemplary session border controller (SBC), in accordance with some embodiments, comprises: a coupling module configured to couple an entity with authentication credentials to an authenticating entity through the SBC; an interface configured to: send an autonomous request, generated by the session border controller, to the authenticating entity; receive a challenge from the authenticating entity in response to the autonomous request; send, by the SBC, a request triggering signal to the entity with authentication credentials, said request triggering signal triggering an entity receiving the signal to generate and send a request to the SBC; receive, by the SBC, a first request from said entity with authentication credentials in response to the request triggering signal sent by the SBC; send, from the SBC to the entity with credentials, the generated challenge in response to the first request; receive, by the SBC, from the entity with credentials, a second request in response to the generated challenge, said second request including a response to the generated challenge; and send, by the SBC, an updated autonomous request to the authenticating entity; a challenge generation module configured to generate, by the SBC, the challenge to the first request using the challenge received from the authenticating entity; and an autonomous request updating module configured to update, by the SBC, said autonomous request using the response to the generated challenge received from the entity with authentication credentials.

In some such embodiments, the session border controller further comprises: a communications session establishment module configured to establish a communication session between the entity with authentication credentials and the authenticating entity prior to sending the autonomous request, generated by the session border controller, to the authenticating entity. In some such embodiments, the autonomous request, first request, second request, and the request triggering signal are SIP request signals.

In various embodiments, the request triggering signal is one of a SIP REFER request, a SIP NOTIFY request or a SIP SUBSCRIBE request.

In some embodiments, the request triggering signal is a SIP SUBSCRIBE request for an event package the entity with credentials supports and the first request is a SIP NOTIFY request.

In various embodiments, the second request is the first request updated to include a response to the generated challenge. In some such embodiments, the response included in the second request includes authentication credentials for the entity with authentication credentials. In some such embodiments, the authentication credentials are an authorization header.

The techniques of various embodiments may be implemented using software, hardware and/or a combination of software and hardware. Various embodiments are directed to apparatus, e.g., border controllers, telecommunications systems, network nodes and/or network equipment devices. Various embodiments are also directed to methods, e.g., method of controlling and/or operating border controllers, telecommunications systems, network nodes and/or network equipment devices. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes and methods disclosed is an example of exemplary approaches. Based upon design preferences, it is understood that the specific order or hierarchy of steps in the processes and methods may be rearranged while remaining within the scope of the present disclosure. The accompanying method claims present elements of the various steps in a sample order, and are not meant to be limited to the specific order or hierarchy presented.

In various embodiments nodes and/or elements described herein are implemented using one or more modules to perform the steps corresponding to one or more methods, for example, message reception, signal processing, checking, authenticating, and/or transmission steps. Thus, in some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., session border controller, including a processor configured to implement one, multiple or all of the steps of one or more methods of the invention.

In some embodiments, the processor or processors, e.g., CPUs, of one or more devices, e.g., communications nodes such as session border controllers are configured to perform the steps of the methods described as being performed by the communications nodes, e.g., session border controllers. The configuration of the processor may be achieved by using one or more modules, e.g., software modules, to control processor configuration and/or by including hardware in the processor, e.g., hardware modules, to perform the recited steps and/or control processor configuration. Accordingly, some but not all embodiments are directed to a device, e.g., communications node such as a session border controller, with a processor which includes a module corresponding to each of the steps of the various described methods performed by the device in which the processor is included. In some but not all embodiments a device, e.g., communications node such as a session border controller, includes a module corresponding to each of the steps of the various described methods performed by the device in which the processor is included. The modules may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a session border controller or node. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device such as a session border controller or other device described in the present application.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A method of operating a session border controller, the method comprising:
storing, by the session border controller, a response from an entity with authentication credentials to a first challenge from an authenticating entity, said response being communicated through the session border controller;
generating, by the session border controller, an autonomous request using the stored response; and
sending the autonomous request to the authenticating entity;
receiving, by the SBC, from the authenticating entity in response to the autonomous request a second challenge;
sending, by the SBC, a first request to the entity with authentication credentials, said first request being a request that will trigger an entity receiving the request to generate and send a request to the SBC;
receiving, by the SBC, a second request from said entity with authentication credentials in response to the first request sent by the SBC;
generating, by the SBC, a challenge to the second request using the second challenge;
sending, from the SBC to the entity with authentication credentials, the generated challenge;
receiving, by the SBC, from the entity with credentials, a third request in response to the generated challenge, said third request including a response to the generated challenge;
updating, by the SBC, said autonomous request using the response to the generated challenge received from the entity with authentication credentials; and
sending, by the SBC, the updated autonomous request to the authenticating entity.

2. The method of claim 1, wherein using the stored response includes including at least a portion of the stored response in the autonomous request.

3. The method of claim 1, wherein the response is included in a Session Initiation Protocol (SIP) request message sent from the entity with the authentication credentials.

4. The method of claim 1 further compromising:
detecting, by the SBC, a fax tone on a communication session established between the entity with authentication credentials and the authenticating entity through the SBC;
said autonomous request being a part of a re-negotiation with the authenticating entity to use a T.38 fax relay standard for a fax transmission.

5. The method of claim 1 wherein the stored response includes authentication credentials for the entity with authentication credentials.

6. The method of claim 1 wherein using the stored response includes adding the stored response to the autonomous request, said stored response being an authorization header.

7. A session border controller (SBC) comprising:
a challenge response storage module configured to store, by the session border controller, a response from an entity with authentication credentials to a first challenge from an authenticating entity, said response being communicated through the session border controller;
a processor that controls the session border controller to generate an autonomous request using the stored response; and
an interface configured to:
send the autonomous request to the authenticating entity,
receive, by the SBC, from the authenticating entity in response to the autonomous request, a second challenge;
send, by the SBC, a first request to the entity with authentication credentials, said first request being a request that will trigger an entity receiving the request to generate and send a request to the SBC;

receive, by the SBC, a second request from said entity with authentication credentials in response to the first request sent by the SBC;

send, from the SBC to the entity with authentication credentials, the generated challenge;

receive, by the SBC, from the entity with credentials, a third request in response to the generated challenge, said third request including a response to the generated challenge; and send, by the SBC, the updated autonomous request to the authenticating entity; and wherein said processor further controls the SBC to: (i) generate a challenge to the second request using the second challenge and (ii) update said autonomous request using the response to the generated challenge received from the entity with authentication credentials.

8. The session border controller of claim 7, wherein using the stored response includes including at least a portion of the stored response in the autonomous request.

9. The session border controller of claim 7, wherein the response is included in a Session Initiation Protocol (SIP) request message sent from the entity with the authentication credentials.

10. The session border controller of claim 7 further compromising:

a fax tone detection module configured to detect, by the SBC, a fax tone on a communication session established between the entity with authentication credentials and the authenticating entity through the SBC;

said autonomous request being a part of a re-negotiation with the authenticating entity to use a T.38 fax relay standard for a fax transmission.

11. A method of operating a session border controller (SBC), the method comprising:

coupling an entity with authentication credentials to an authenticating entity through the SBC;

sending an autonomous request, generated by the session border controller, to the authenticating entity;

receiving a challenge from the authenticating entity in response to the autonomous request;

sending, by the SBC, a request triggering signal to the entity with authentication credentials, said request triggering signal triggering an entity receiving the signal to generate and send a request to the SBC;

receiving, by the SBC, a first request from said entity with authentication credentials in response to the request triggering signal sent by the SBC;

generating, by the SBC, a challenge to the first request using the challenge received from the authenticating entity;

sending, from the SBC to the entity with credentials, the generated challenge in response to the first request;

receiving, by the SBC, from the entity with credentials, a second request in response to the generated challenge, said second request including a response to the generated challenge;

updating, by the SBC, said autonomous request using the response to the generated challenge received from the entity with authentication credentials; and sending, by the SBC, the updated autonomous request to the authenticating entity.

12. The method of claim 11 further comprising:

establishing a communication session between the entity with authentication credentials and the authenticating entity prior to sending the autonomous request, generated by the session border controller, to the authenticating entity.

13. The method of claim 12 wherein the autonomous request, first request, second request, and the request triggering signal are Session Initiation Protocol (SIP) request signals.

14. The method of claim 12 wherein the request triggering signal is a Session Initiation Protocol (SIP) SUBSCRIBE request for an event package the entity with credentials supports and the first request is a SIP NOTIFY request.

15. The method of claim 12 wherein the second request is the first request updated to include a response to the generated challenge.

16. The method of claim 11 wherein the request triggering signal is one of a Session Initiation Protocol (SIP) REFER request, a SIP NOTIFY request or a SIP SUBSCRIBE request.

17. A session border controller (SBC) comprising:

a processor that controls the SBC to couple an entity with authentication credentials to an authenticating entity through the SBC;

an interface configured to:

send an autonomous request, generated by the session border controller, to the authenticating entity;

receive a challenge from the authenticating entity in response to the autonomous request;

send, by the SBC, a request triggering signal to the entity with authentication credentials, said request triggering signal triggering an entity receiving the signal to generate and send a request to the SBC;

receive, by the SBC, a first request from said entity with authentication credentials in response to the request triggering signal sent by the SBC;

send, from the SBC to the entity with credentials, the generated challenge in response to the first request;

receive, by the SBC, from the entity with credentials, a second request in response to the generated challenge, said second request including a response to the generated challenge; and send, by the SBC, an updated autonomous request to the authenticating entity;

said processor also controls the SBC to: (i) generate the challenge to the first request using the challenge received from the authenticating entity and (ii) update said autonomous request using the response to the generated challenge received from the entity with authentication credentials.

18. The session border controller of claim 17 further comprising:

a communications session establishment module configured to establish a communication session between the entity with authentication credentials and the authenticating entity prior to sending the autonomous request, generated by the session border controller, to the authenticating entity.

19. The session border controller of claim 18 wherein the request triggering signal is a Session Initiation Protocol (SIP) SUBSCRIBE request for an event package the entity with credentials supports and the first request is a SIP NOTIFY request.

20. The session border controller of claim 17 wherein the request triggering signal is one of a Session Initiation Protocol (SIP) REFER request, a SIP NOTIFY request or a SIP SUBSCRIBE request.

* * * * *